(12) United States Patent
Min et al.

(10) Patent No.: US 9,712,823 B2
(45) Date of Patent: *Jul. 18, 2017

(54) VIDEO-ENCODING METHOD AND VIDEO-ENCODING APPARATUS USING PREDICTION UNITS BASED ON ENCODING UNITS DETERMINED IN ACCORDANCE WITH A TREE STRUCTURE, AND VIDEO-DECODING METHOD AND VIDEO-DECODING APPARATUS USING PREDICTION UNITS BASED ON ENCODING UNITS DETERMINED IN ACCORDANCE WITH A TREE STRUCTURE

(71) Applicant: SAMSUNG ELECTRONICS CO., LTD., Suwon-si (KR)

(72) Inventors: Jung-hye Min, Suwon-si (KR); Woo-jin Han, Suwon-si (KR); Il-koo Kim, Osan-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/400,424

(22) Filed: Jan. 6, 2017

(65) Prior Publication Data

US 2017/0118469 A1 Apr. 27, 2017

Related U.S. Application Data

(63) Continuation of application No. 14/964,893, filed on Dec. 10, 2015, now Pat. No. 9,565,438, which is a
(Continued)

(51) Int. Cl.
*H04N 19/50* (2014.01)
*H04N 19/119* (2014.01)
(Continued)

(52) U.S. Cl.
CPC ......... *H04N 19/119* (2014.11); *H04N 19/159* (2014.11); *H04N 19/44* (2014.11);
(Continued)

(58) Field of Classification Search
CPC .................................................. H04N 19/50
(Continued)

(56) References Cited

U.S. PATENT DOCUMENTS 6,028,634 A 2/2000 Yamaguchi et al.
6,240,135 B1 5/2001 Kim
(Continued)

FOREIGN PATENT DOCUMENTS

CA 2715211 A1 9/2009
CN 1531824 A 9/2004
(Continued)

OTHER PUBLICATIONS

"Digital broadcast textbook in IPTV era", Apr. 1, 2010, 12 pages total, ISBN: 978-4-8443-2853-7, Impress R&D.
(Continued)

*Primary Examiner* — William C Vaughn, Jr.
*Assistant Examiner* — Luis Perez Fuentes
(74) *Attorney, Agent, or Firm* — Sughrue Mion, PLLC

(57) ABSTRACT

Provided are a method and apparatus for encoding a video and a method and apparatus for decoding a video. The encoding method includes: splitting a picture of the video into one or more maximum coding units; encoding the picture based on coding units according to depths which are obtained based on a partition type determined according to the depths of the coding units according to depths, determining coding units according to coded depths with respect to each of the coding units according to depths, and thus determining coding units having a tree structure; and outputting data that is encoded based on the partition type and
(Continued)

the coding units having the tree structure, information about the coded depths and an encoding mode, and coding unit structure information indicating a size and a variable depth of a coding unit.

1 Claim, 12 Drawing Sheets

Related U.S. Application Data continuation of application No. 13/641,418, filed as application No. PCT/KR2011/002649 on Apr. 13, 2011, now Pat. No. 9,247,247.

(60) Provisional application No. 61/323,449, filed on Apr. 13, 2010.

(51) Int. Cl.
    H04N 19/159     (2014.01)
    H04N 19/44      (2014.01)
    H04N 19/96      (2014.01)
    H04N 19/184     (2014.01)
    H04N 19/172     (2014.01)

(52) U.S. Cl.
    CPC .......... H04N 19/50 (2014.11); H04N 19/172 (2014.11); H04N 19/184 (2014.11); H04N 19/96 (2014.11)

(58) Field of Classification Search
    USPC ........................................ 375/240
    See application file for complete search history.

(56) References Cited

U.S. PATENT DOCUMENTS

| | | | |
|---|---|---|---|
| 6,519,285 B2 | 2/2003 | Yamaguchi et al. | |
| 6,792,047 B1 | 9/2004 | Bixby et al. | |
| 7,050,504 B2 | 5/2006 | Joch et al. | |
| 7,120,197 B2 | 10/2006 | Lin et al. | |
| 7,262,886 B2 | 8/2007 | Kim et al. | |
| 7,302,006 B2* | 11/2007 | Apostolopoulos ... | H04N 19/176 375/240.24 |
| RE40,178 E | 3/2008 | Kim | |
| 7,352,812 B2 | 4/2008 | Sun et al. | |
| 7,460,042 B2 | 12/2008 | Oshikiri et al. | |
| 7,512,179 B2 | 3/2009 | Sanson et al. | |
| 7,613,241 B2 | 11/2009 | Hong | |
| 8,086,052 B2 | 12/2011 | Toth et al. | |
| 8,363,936 B2* | 1/2013 | Divorra Escoda ... | H04N 19/176 382/167 |
| 8,457,198 B2 | 6/2013 | Baik | |
| 8,594,183 B2* | 11/2013 | Han ...................... | H04N 19/52 375/240.01 |
| 8,611,416 B2 | 12/2013 | Hwang et al. | |
| 8,699,562 B2 | 4/2014 | Park et al. | |
| 8,718,139 B2 | 5/2014 | Yamada et al. | |
| 8,792,547 B2* | 7/2014 | Min ..................... | H04N 19/105 375/240 |
| 9,118,913 B2 | 8/2015 | Alshina et al. | |
| 9,215,461 B2 | 12/2015 | Kim et al. | |
| 9,247,247 B2* | 1/2016 | Min ..................... | H04N 19/50 |
| 9,426,466 B2* | 8/2016 | Van der Auwera .. | H04N 19/176 |
| 2004/0081238 A1 | 4/2004 | Parhy | |
| 2004/0151247 A1 | 8/2004 | Sanson et al. | |
| 2005/0163217 A1 | 7/2005 | Shin et al. | |
| 2006/0193385 A1 | 8/2006 | Yin et al. | |
| 2007/0171974 A1 | 7/2007 | Baik | |
| 2008/0117976 A1 | 5/2008 | Lu et al. | |
| 2008/0144722 A1 | 6/2008 | Park et al. | |
| 2008/0170629 A1 | 7/2008 | Shim et al. | |
| 2009/0003447 A1 | 1/2009 | Christoffersen et al. | |
| 2009/0196517 A1 | 8/2009 | Divorra Escoda et al. | |
| 2009/0207911 A1 | 8/2009 | Minamoto | |
| 2010/0086030 A1 | 4/2010 | Chen et al. | |
| 2010/0086032 A1 | 4/2010 | Chen et al. | |
| 2010/0118959 A1 | 5/2010 | Lou et al. | |
| 2010/0208827 A1 | 8/2010 | Divorra Escoda et al. | |
| 2011/0051801 A1 | 3/2011 | Hwang et al. | |
| 2013/0315299 A1 | 11/2013 | Kim et al. | |
| 2014/0294065 A1 | 10/2014 | Chen et al. | |
| 2015/0016525 A1 | 1/2015 | Alshina et al. | |

FOREIGN PATENT DOCUMENTS

| | | |
|---|---|---|
| CN | 1857001 A | 11/2006 |
| CN | 1910925 A | 2/2007 |
| CN | 101009833 A | 8/2007 |
| EP | 1933566 A2 | 6/2008 |
| EP | 2485490 A2 | 8/2012 |
| EP | 2629528 | 3/2015 |
| JP | 2003-299100 A | 10/2003 |
| JP | 2007202150 A | 8/2007 |
| JP | 2011-501566 A | 1/2011 |
| JP | 2011-526770 A | 10/2011 |
| KR | 1999024963 A | 4/1999 |
| KR | 20010081142 A | 6/2001 |
| KR | 1020010081142 A | 8/2001 |
| KR | 20030081403 A | 10/2003 |
| KR | 1020030081403 A | 10/2003 |
| KR | 1020070027781 A | 3/2007 |
| KR | 100842558 B1 | 7/2008 |
| KR | 1020080066521 A | 7/2008 |
| KR | 10-2009-0057225 A | 6/2009 |
| KR | 1020090081672 A | 7/2009 |
| KR | 1020090097833 A | 9/2009 |
| KR | 1020110017719 A | 2/2011 |
| KR | 1020110036520 A | 4/2011 |
| RU | 2006128854 A | 3/2008 |
| RU | 2369039 C1 | 9/2009 |
| RU | 2384971 C1 | 3/2010 |
| WO | 2004104930 A2 | 12/2004 |
| WO | 2009051719 A2 | 4/2009 |
| WO | 2009093879 A2 | 7/2009 |
| WO | 2010/002214 A2 | 1/2010 |
| WO | 2010/039728 A3 | 4/2010 |
| WO | 2010/095915 A3 | 8/2010 |
| WO | 2011019290 A2 | 2/2011 |
| WO | 2011/040795 A2 | 4/2011 |
| WO | 2011087297 A2 | 7/2011 |

OTHER PUBLICATIONS

"Image encoding of One Seg, broadcast technology", Jun. 1, 2008, 10 pages total, vol. 61 No. 6, ISSN: 0287-8658.

"Impress standard textbook series, revision 3, H.264/AVC textbook", Jan. 1, 2009, 14 pages total, first edition, ISBNL 978-4-8443-2664-9.

"Performance improvement of H.264 software decoder", Mar. 7, 2006, 10 pages total, Information Process Society.

"Ubiquitous technology, high efficiency of moving pictures—MPEG-4 and H.264", Apr. 20, 2005, 8 pages total, first edition, Ohm Co., Ltd., ISBN: 4-274-20060-4.

"Verification of effects of asymmetric macro block division and mounting method in H.26L", Nov. 15, 2002, 11 pages total, vol. 2002 No. 106, Search Report of Information Process Society.

Communication dated Aug. 21, 2015 issued by Korean Intellectual Property Office in counterpart Korean Application No. 10-2011-0034413.

Communication dated Jan. 13, 2016, issued by the Korean Intellectual Property Office in counterpart Korean Application No. 10-2011-0034461.

Communication dated Jan. 25, 2016, issued by the Canadian Intellectual Property Office in counterpart Canadian Application No. 2,796,364.

Communication dated Jul. 21, 2015 issued by European Patent Office in European Application No. 11 769 087.5.

Communication dated Mar. 31, 2016, issued by the Korean Intellectual Property Office in counterpart Korean Application No. 10-2016-0024714.

(56) References Cited

OTHER PUBLICATIONS

Communication dated Oct. 25, 2016, issued by the Russian Intellectual Property Office in counterpart Russion Application No. 2014127502/08.
Communication dated Oct. 4, 2013, issued by the Australian Patent Office in counterpart Australian Application No. 2011241282.
Communication dated Sep. 12, 2013, issued by the Australian Patent Office in counterpart Australian Application No. 2011241283.
Communication dated Sep. 14, 2015 issued by Australian Intellectual Property Office in counterpart Australian Patent Application No. 2015200779.
Communication dated Sep. 15, 2015 issued by Japanese Intellectual Property Office in counterpart Japanese Patent Application No. 2013-504826.
Communication dated Sep. 15, 2016, issued by the European Patent Office in counterpart European Application No. 11769087.5.
Communication dated Sep. 2, 2016, issued by the Korean Intellectual Property Office in counterpart Korean Application No. 10-2016-0024714.
Communication dated Sep. 29, 2016, issued by the Russian Intellectual Property Office in counterpart Russion Application No. 2014128147/08.
Communication from the Australian Patent Office issued Jan. 21, 2015 in a counterpart Australian Application No. 2011241284.
Communication from the Australian Patent Office issued Oct. 14, 2014, in a counterpart Australian Application No. 2011241283.
Communication from the Canadian Patent Office issued Nov. 4, 2014, in a counterpart Canadian Application No. 2796364.
Communication from the Canadian Patent Office issued Oct. 29, 2014, in a counterpart Canadian Application No. 2796203.
Communication from the Japanese Patent Office dated Feb. 10, 2015 in a counterpart Japanese application No. 2013-504827.
Communication from the Japanese Patent Office dated Feb. 17, 2015 in a counterpart Japanese application No. 2013-504826.
Communication from the Japanese Patent Office dated Oct. 6, 2015 in a counterpart Japanese application No. 2013-504828.
Communication from the Korean Intellectual Property Office dated Dec. 18, 2015 in a counterpart Korean application No. 10-2011-0034413.
Communication from the Korean Intellectual Property Office dated Dec. 18, 2015 in a counterpart Korean application No. 10-2011-0034414.
Communication from the Korean Intellectual Property Office dated Dec. 18, 2015 in a counterpart Korean application No. 10-2014-0148758.
Communication from the Korean Intellectual Property Office dated Oct. 20, 2015 in a counterpart Korean application No. 10-2011-0034461.
Communication from the State Intellectual Property Office of P.R. China dated Dec. 31, 2014, in a counterpart application No. 201180029083.1.
Communication from the State Intellectual Property Office of P.R. China dated Jan. 27, 2015 in a counterpart application No. 201180028147.6.
Communication from the State Intellectual Property Office of P.R. China dated Mar. 26, 2015 in a counterpart application No. 201180029233.9.
Communication issued Jun. 8, 2016, issued by the Korean intellectual Property Office in counterpart Korean Patent Application No. 10-2014-0148759.
Communication issued on Feb. 24, 2015 by the Indonesian Patent Office in related Application No. W00201204687.
Communication, dated Apr. 25, 2014, issued by the Russian Patent Office in counterpart Russian Application No. 2012148138/08(077281).
Communication, dated Dec. 9, 2013, issued by the Russian Patent Office in counterpart Russian Application No. 2012148127/08(077270).
Communication, dated Jun. 27, 2014, issued by the Mexican Patent Office in counterpart Mexican Application No. MX/a/2012/012017.
Communication, dated Jun. 4, 2014, issued by the European Patent Office in counterpart European Application No. 11769085.9.
Communication, dated Jun. 4, 2014, issued by the European Patent Office in counterpart European Application No. 11769086.7.
Communication, dated Jun. 4, 2014, issued by the European Patent Office in counterpart European Application No. 11769087.5.
Final Rejection issued Apr. 26, 2016, issued by the Japanese Patent Office in counterpart Japanese Patent Application No. 2013-504826.
Han, Woo-Jin et al., "Improved Video Compression Efficiency Through Flexible Unite Representation and Corresponding Extension of Coding Tools," IEEE Transactions on Circuits and Systems for Video Technology, vol. 20, No. 12, Dec. 2010, pp. 1709-1720.
International Search Report (PCT/ISA/220, PCT/ISA/210, & PCT/ISA/237) dated Dec. 20, 2011 from the International Searching Authority in counterpart application No. PCT/KR2011/002647.
International Search Report (PCT/ISA/220, PCT/ISA/210, & PCT/ISA/237) dated Dec. 21, 2011 from the International Searching Authority in counterpart application No. PCT/KR2011/002648.
International Search Report (PCT/ISA/220, PCT/ISA/210, & PCT/ISA/237) dated Dec. 26, 2011 from the International Searching Authority in counterpart application No. PCT/KR2011/002649.
International Search Report dated Dec. 20, 2011 issued in International Application No. PCT/KR2011/002647 (PCT/ISA/210).
International Search Report dated Dec. 21, 2011 issued in International Application No. PCT/KR2011/002648 (PCT/ISA/210).
International Search Report dated Dec. 26, 2011 issued in International Application No. PCT/KR2011/002649 (PCT/ISA/210).
ITU-T Recommendation H.264 (Mar. 2005), "Advanced video coding for generic audiovisual services", [Online], Mar. 2005, ITU-T, total 21 pages.
McCann, Ken et al., "Samsung's Response to the Call for Proposals on Video Compression Technology," Joint Collaborative Team on Video Coding (JCT-VC) of ITU-T SG16 WP3 and ISO/IEC JTC1/SC29/WG11, 1st Meeting, Dresden, DE; Apr. 15-23, 2010, pp. 1-40.
Naito, S. et al., "Efficient coding scheme for super high definition video based on extending H.264 high profile," Proceedings of SPIE, SPIE—International Society for Optical Engineering, vol. 6077, No. 67727, Jan. 18, 2006, pp. 1-8.
Office Action (Patent Examination Report) dated Jul. 15, 2016, issued by the Australian Patent Office in counterpart Australian Application No. 2015202094.
Puri, Atul et al., "Video coding using the H.264/MPEG-4 AVC compression standard," Signal Processing: Image Communication, Elsevier Science Publishers, Amsterdam, NL, vol. 19, No. 9, Oct. 1, 2004, pp. 793-849.
Rejection of amendment issued Apr. 26, 2016, issued by the Japanese Patent Office in counterpart Japanese Patent Application No. 2013-504826.
Schwarz, Heiko, et al., "Errata report and drafting update for ITU-T Rec. H.264 ISO/IEC 14496-10," Joint Video Team (JVT) of ISO/IEC MPEG & ITU-T VCEG (ISO/IEC JTC1/SC29/WG11 and ITU-T SG16 Q.6), 32nd Joint Video Team Meeting, Geneva, Nov. 2-4, 2009, pp. 1-86.
Tambankar A et al., "An overview of H.264/MPEG-4 part 10", Video/Image Processing and Multimedia Communications, Jul. 2-5, 2003, 51 pages of total, vol. 1, IEEE, Zagreb, Croatia, XP010650106.
Wiegand, T., et al., "WD3: Working Draft 3 of High-Efficiency Video Coding", [Online], Apr. 6, 2011, Collaborative Team on Video Coding (JCT-VC) of ITU-T SG16 WP3 and ISO/IEC JTC1/SC29/WG11, Document: JCTVC-E603, (Version 2), total 24 pages.
Written Opinion dated Dec. 20, 2011 issued in International Application No. PCT/KR2011/002647 (PCT/ISA/210).
Non-Final Office Action mailed Apr. 24, 2015 in U.S. Appl. No. 13/641,418.
Notice of Allowance mailed Oct. 22, 2015 in U.S. Appl. No. 13/641,418.
Notice of Allowance mailed May 18, 2016 in U.S. Appl. No. 14/964,893.
Communication dated Mar. 14, 2017, issued by the Japanese Patent Office in counterpart Japanese Application No. 2016-021347.
Shun-ichi Sekiguchi et al., "Low-overheard INTER Prediction Modes", ITU-Telecommunications Standardization Sector, Study

(56) References Cited

OTHER PUBLICATIONS

Group 16, Video Coding Experts Group (VCEG), 14th Meeting, Santa Barbara, CA, USA, Sep. 24-27, 2001, Doc: VCEG-N45, pp. 1-6. (7 pages total).
Ken Mccann et al., "JCT-VC AHG Report: HEVC Draft and Test Model editing", Joint Collaborative Team on Video Coding (JCT-VC) of ITU-T SG16 WP3 and ISO/IEC JTC1/SC29NVG11, 5th Meeting: Geneva, CH, Mar. 16-23, 2011, Doc: JCTVC-E002, pp. 1-4. (5 pages total).

\* cited by examiner

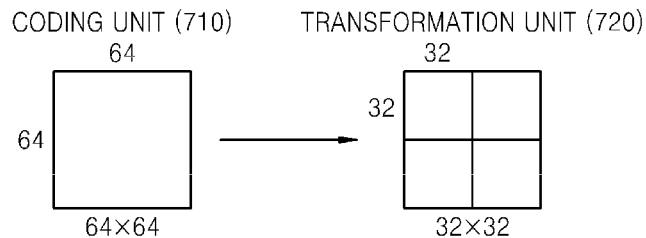
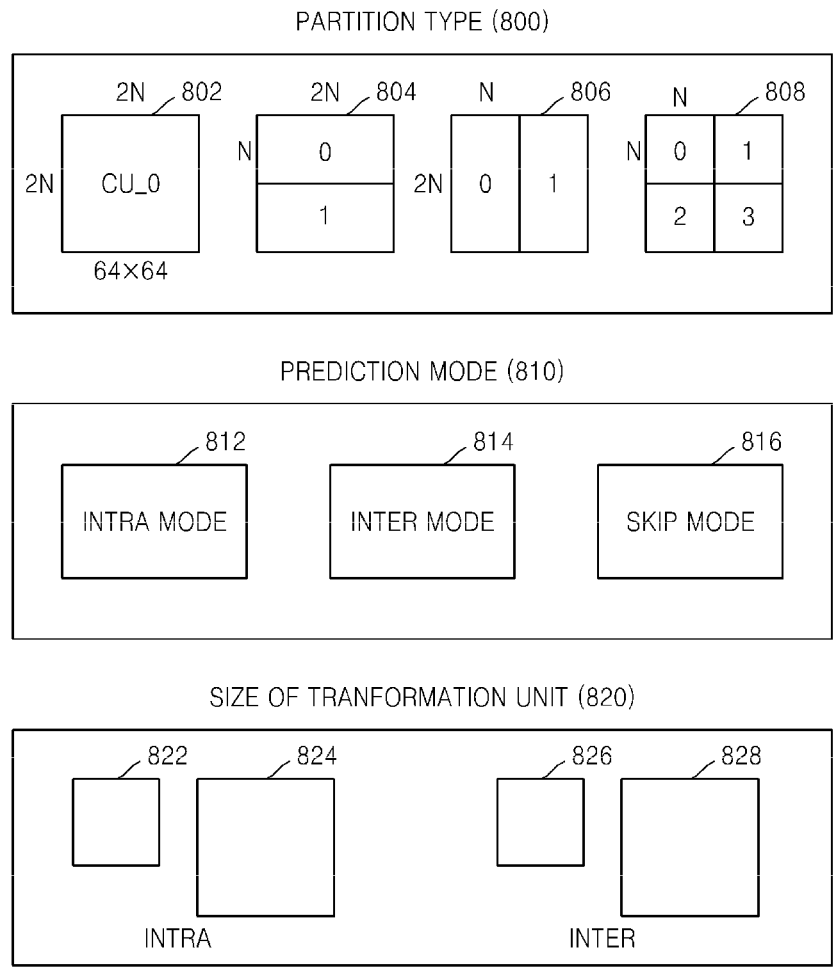

CODING UNIT (1010)

VIDEO-ENCODING METHOD AND VIDEO-ENCODING APPARATUS USING PREDICTION UNITS BASED ON ENCODING UNITS DETERMINED IN ACCORDANCE WITH A TREE STRUCTURE, AND VIDEO-DECODING METHOD AND VIDEO-DECODING APPARATUS USING PREDICTION UNITS BASED ON ENCODING UNITS DETERMINED IN ACCORDANCE WITH A TREE STRUCTURE

CROSS-REFERENCE TO RELATED APPLICATIONS

This application is a continuation of U.S. application Ser. No. 14/964,893, filed Dec. 10, 2015, which is a continuation of U.S. application Ser. No. 13/641,418, filed Oct. 15, 2012, now U.S. Pat. No. 9,247,247 issued Jan. 26, 2016, which is a National Stage application under 35 U.S.C. §371 of PCT/KR2011/002649 filed on Apr. 13, 2011, which claims the benefit of U.S. Provisional Application No. 61/323,449, filed on Apr. 13, 2010 in the United States Patent and Trademark Office, the disclosure of which is incorporated herein by reference in its entirety.

BACKGROUND

1. Field

Apparatuses and methods consistent with exemplary embodiments relate to video encoding and video decoding which perform transformation between a spatial region and a transformation region.

2. Description of the Related Art

As hardware for reproducing and storing high resolution or high quality video content is being developed and supplied, a need for a video codec for effectively encoding or decoding the high resolution or high quality video content is increasing. In a related art video codec, a video is encoded according to a limited encoding method based on a macroblock having a predetermined size. Also, the related art video codec performs transformation and inverse transformation on the macroblock by using a block having the same size, and thus encodes and decodes video data accordingly.

SUMMARY

Aspects of one or more exemplary embodiments provide video encoding and video decoding which perform transformation between a spatial region and a transformation region by using a hierarchical prediction partition.

According to an aspect of an exemplary embodiment, there is provided a method of decoding a video by using a prediction unit based on coding units having a tree structure, the method including operations of: receiving a bitstream with respect to an encoded video and parsing the bitstream; extracting coding unit structure information indicating a size and a variable depth of a coding unit that is a data unit for decoding of a picture of the video, and information about a coded depth and an encoding mode with respect to coding units having a tree structure of the picture from the bitstream; and determining the coding units having the tree structure based on the coding unit structure information and the information about the coded depth and the encoding mode, determining a partition type based on a depth of a current coding unit, and decoding the picture based on the coding units and the partition type.

According to an aspect of another exemplary embodiment, there is provided a method of decoding a video by using a prediction unit based on coding units having a tree structure, the method including operations of: receiving a bitstream with respect to an encoded video and parsing the bitstream; extracting coding unit structure information indicating a size and a variable depth of a coding unit that is a data unit for decoding of a picture of the video, and information about a coded depth and an encoding mode with respect to coding units having a tree structure of the picture from the bitstream; and determining the coding units having the tree structure based on the coding unit structure information and the information about the coded depth and the encoding mode, determining a partition type based on a depth of a current coding unit, and decoding the picture based on the coding units and the partition type.

The partition type may include a data unit having the same size as the current coding unit, and a partial data unit obtained by splitting one of a height and a width of the current coding unit.

According to an aspect of another exemplary embodiment, there is provided a method of encoding a video by using a prediction unit based on coding units having a tree structure, the method including operations of: splitting a picture of the video into one or more maximum coding units that are coding units having a maximum size; encoding the picture based on coding units according to depths which are obtained by hierarchically splitting each of the one or more maximum coding units according to depths in each of the one or more maximum coding units and based on a partition type determined according to the depths of the coding units according to depths, determining coding units according to coded depths with respect to each of the coding units according to depths, and thus determining coding units having a tree structure; and outputting data that is encoded based on the partition type and the coding units having the tree structure, information about the coded depths and an encoding mode, and coding unit structure information indicating a size and a variable depth of a coding unit.

According to an aspect of another exemplary embodiment, there is provided a video decoding apparatus including a video decoding processor and using a prediction unit based on coding units having a tree structure, the video decoding apparatus including: a receiver for receiving a bitstream with respect to an encoded video, and then parsing the bitstream; an extractor for extracting coding unit structure information indicating a size and a variable depth of a coding unit that is a data unit for decoding of a picture of the video, and information about a coded depth and an encoding mode with respect to coding units having a tree structure of the picture from the bitstream; and a decoder for determining the coding units having the tree structure based on the coding unit structure information and the information about the coded depth and the encoding mode, determining a partition type based on a depth of a current coding unit, and decoding the picture based on the coding units and the partition type, in associated with the video decoding processor.

According to an aspect of another exemplary embodiment, there is provided a video encoding apparatus including a video encoding processor and using a prediction unit based on coding units having a tree structure, the video encoding apparatus including: a maximum coding unit splitter for splitting a picture of a video into one or more maximum coding units that are coding units having a maximum size; a coding unit determiner for encoding the picture based on coding units according to depths which are obtained by hierarchically splitting each of the one or more maximum coding units according to depths in each of the one or more maximum coding units and based on a partition type determined according to the depths of the coding units according to depths, determining coding units according to coded depths with respect to each of the coding units according to depths, and thus determining coding units having a tree structure, in associated with the video encoding processor; and an output unit for outputting data that is encoded based on the partition type and the coding units having the tree structure, information about the coded depths and an encoding mode, and coding unit structure information indicating a size and a variable depth of a coding unit.

According to an aspect of another exemplary embodiment, there is provided a computer-readable recording medium having recorded thereon a program for executing the method of encoding a video, by using a computer.

According to an aspect of another exemplary embodiment, there is provided a computer-readable recording medium having recorded thereon a program for executing the method of decoding a video, by using a computer.

According to aspects of one or more exemplary embodiments, an image compression efficiency may be increased since a coding unit is hierarchically adjusted while considering characteristics of an image while increasing a maximum size of a coding unit while considering a size of the image. Since an encoder transmits coded video data with information about a coded depth and an encoding mode, a decoder may decode each piece of encoded image data after determining at least one coded depth according to coding units having a tree structure, so that encoding and decoding efficiency of an image may be improved.

BRIEF DESCRIPTION OF THE DRAWINGS

FIG. 7 is a diagram for describing a relationship between a coding unit and transformation units, according to an exemplary embodiment;

FIG. 8 is a diagram for describing encoding information of coding units corresponding to a coded depth, according to an exemplary embodiment;

DETAILED DESCRIPTION OF EXEMPLARY EMBODIMENTS

Figure 1:
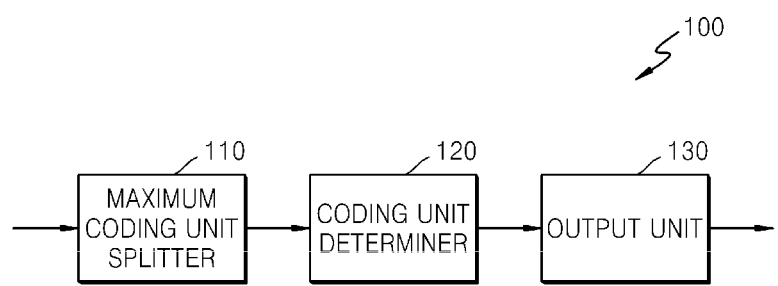
FIG. 1 is a block diagram of an apparatus for encoding a video by using a prediction unit based on coding units having a tree structure according to an exemplary embodiment.

Hereinafter, exemplary embodiments will be described more fully with reference to the accompanying drawings, in which like reference numerals refer to like elements throughout. In the current description, the term 'image' may collectively indicate not only a still image but also a moving picture such as video.

Hereinafter, apparatuses and methods of encoding and decoding a video by using a prediction unit based on coding units having a tree structure will be described in detail with reference to FIGS. 1 through 15.

FIG. 1 is a block diagram of an apparatus for encoding a video by using a prediction unit based on coding units having a tree structure 100 according to an exemplary embodiment.

The apparatus for encoding a video by using a prediction unit based on coding units having a tree structure 100 includes a maximum coding unit splitter 110, a coding unit determiner 120, and an output unit 130. Hereinafter, for convenience of description, the apparatus for encoding a video by using a prediction unit based on coding units having a tree structure 100 is referred to as 'video encoding apparatus 100'.

The maximum coding unit splitter 110 may split a current picture based on a maximum coding unit for the current picture of an image. If the current picture is larger than the maximum coding unit, image data of the current picture may be split into the at least one maximum coding unit. The maximum coding unit according to an exemplary embodiment may be a data unit having a size of 32×32, 64×64, 128×128, 256×256, etc., wherein a shape of the data unit is a square having a width and length in squares of 2. The image data may be output to the coding unit determiner 120 according to the at least one maximum coding unit.

A coding unit according to an exemplary embodiment may be characterized by a maximum size and a depth. The depth denotes a number of times the coding unit is spatially split from the maximum coding unit, and as the depth deepens, deeper coding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit deepens, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Since the maximum coding unit according to an exemplary embodiment is split according to depths, the image data of a spatial domain included in the maximum coding unit may be hierarchically classified according to depths.

A maximum depth and a maximum size of a coding unit, which limit the total number of times a height and a width of the maximum coding unit are hierarchically split, may be predetermined.

The coding unit determiner 120 encodes at least one split region obtained by splitting a region of the maximum coding unit according to depths, and determines a depth to output a finally encoded image data according to the at least one split region. In other words, the coding unit determiner 120 determines a coded depth by encoding the image data in the deeper coding units according to depths, according to the maximum coding unit of the current picture, and selecting a depth having the least encoding error. Thus, the encoded image data of the coding unit corresponding to the determined coded depth is finally output. Also, the coding units corresponding to the coded depth may be regarded as encoded coding units.

The determined coded depth and the encoded image data according to the determined coded depth are output to the output unit 130.

The image data in the maximum coding unit is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one coded depth may be selected for each maximum coding unit.

The size of the maximum coding unit is split as a coding unit is hierarchically split according to depths, and as the number of coding units increases. Also, even if coding units correspond to same depth in one maximum coding unit, it is determined whether to split each of the coding units corresponding to the same depth to a lower depth by measuring an encoding error of the image data of the each coding unit, separately. Accordingly, even when image data is included in one maximum coding unit, the image data is split to regions according to the depths and the encoding errors may differ according to regions in the one maximum coding unit, and thus the coded depths may differ according to regions in the image data. Thus, one or more coded depths may be determined in one maximum coding unit, and the image data of the maximum coding unit may be split according to coding units of at least one coded depth.

Accordingly, the coding unit determiner 120 may determine coding units having a tree structure included in the maximum coding unit. The 'coding units having a tree structure' according to an exemplary embodiment include coding units corresponding to a depth determined to be the coded depth, from among all deeper coding units included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

A maximum depth according to an exemplary embodiment is an index related to the number of splitting times from a maximum coding unit to a minimum coding unit. A maximum depth according to an exemplary embodiment may denote the total number of splitting times from the maximum coding unit to the minimum coding unit. For example, when a depth of the maximum coding unit is 0, a depth of a coding unit, in which the maximum coding unit is split once, may be set to 1, and a depth of a coding unit, in which the maximum coding unit is split twice, may be set to 2. Here, if the minimum coding unit is a coding unit in which the maximum coding unit is split four times, 5 depth levels of depths 0, 1, 2, 3 and 4 exist, and thus the maximum depth may be set to 4.

Prediction encoding and transformation may be performed according to the maximum coding unit. The prediction encoding and the transformation are also performed based on the deeper coding units according to a depth equal to or depths less than the maximum depth, according to the maximum coding unit. Transformation may be performed according to method of frequency transformation, orthogonal transformation or integer transformation.

Since the number of deeper coding units increases whenever the maximum coding unit is split according to depths, encoding including the prediction encoding and the transformation is performed on all of the deeper coding units generated as the depth deepens. For convenience of description, the prediction encoding and the transformation will now be described based on a coding unit of a current depth, in a maximum coding unit.

The video encoding apparatus 100 may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform prediction encoding in the maximum coding unit, the prediction encoding may be performed based on a coding unit corresponding to a coded depth, i.e., based on a coding unit that is no longer split to coding units corresponding to a lower depth. Hereinafter, the coding unit that is no longer split and becomes a basis unit for prediction encoding will now be referred to as a 'prediction unit'. A partition obtained by splitting the prediction unit may include a prediction unit or a data unit obtained by splitting at least one of a height and a width of the prediction unit.

For example, when a coding unit of 2N×2N (where N is a positive integer) is no longer split and becomes a prediction unit of 2N×2N, and a size of a partition may be 2N×2N, 2N×N, or N×2N. Examples of a partition type include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A size of the partition type or the prediction unit of the coding unit may be determined according to whether split is performed on a current coding unit with a current depth or a lower depth.

When the partition type of the current coding is a symmetrical partition type, the symmetrical partition type of the current coding unit may include a partition having the same size as the current coding unit, and a partition obtained by dividing a height or width of the current coding unit by two. That is, a symmetrical partition type of a coding unit having a size of 2N×2N may include partitions of 2N×2N, 2N×N, or N×2N.

When the current coding unit is no longer split into coding units of a lower depth, the symmetrical partition type of the current coding unit may include partitions having the same size as the coding units of the lower depth. That is, when the current coding unit is a minimum coding unit that cannot be split into coding units of a lower depth and that is from among current maximum coding units, the symmetrical partition type of the current coding unit may include not only the partitions of 2N×2N, 2N×N, and N×2N but also may include a partition having a size of N×N.

Similarly, when the current coding unit is a coding unit of a lowest depth from among the current maximum coding units, the symmetrical partition type of the current coding unit may include not only the partitions of 2N×2N, 2N×N, and N×2N but also may include a partition having a size of N×N.

For example, when a coding unit having a current depth and a size of 2N×2N is split once and thus is divided into coding units having a lower depth and a size of N×N, intra prediction and inter prediction may be performed on the coding unit having the size of N×N by using the partition having the size of N×N. Thus, in order to avoid repetition of an unnecessary process, in a structure of hierarchical coding units according to the present exemplary embodiment, a partition type having a size of N×N may not be set to the coding unit having the size of 2N×2N.

However, when the current coding unit having the size of 2N×2N is the minimum coding unit, the current coding unit is no longer split into coding units having a size of N×N, so that the inter prediction or the intra prediction may be performed on the current coding unit by using partitions having a size of N×N. Thus, the partition type of the minimum coding unit having the size of 2N×2N may include the partitions of 2N×2N, 2N×N, N×2N, and N×N.

A prediction mode of the prediction unit may be at least one of an intra mode, a inter mode, and a skip mode. For example, prediction encoding in the intra mode and the inter mode may be performed on the partition of 2N×2N, 2N×N, or N×2N.

That is, in at least one of cases in which the current coding unit is not the minimum coding unit, in which the current coding unit is split into coding units of a lower depth, and in which the current coding unit is not the coding unit of a lowest depth from among the current maximum coding units, the inter prediction and the intra prediction which are performed by using the partition of N×N may be skipped.

However, when the current coding unit is the minimum coding unit, since the intra prediction and the inter prediction cannot be performed on a coding unit of a lower depth, the inter prediction and the intra prediction may be performed on the minimum coding unit by using the partitions of 2N×2N, 2N×N, N×2N, and N×N.

Also, the skip mode may be performed only on the partition of 2N×2N. The encoding is independently performed on one prediction unit in a coding unit, thereby selecting a prediction mode causing a least encoding error.

The video encoding apparatus 100 may also perform the transformation on the image data in a coding unit based not only on the coding unit for encoding the image data, but also based on a data unit that is different from the coding unit.

In order to perform the transformation in the coding unit, the transformation may be performed based on a transformation unit having a size smaller than or equal to the coding unit. For example, the transformation unit for the transformation may include a transformation unit for an intra mode and a transformation unit for an inter mode.

Similarly to the coding unit having a tree structure, the transformation unit in the coding unit may be recursively split into smaller sized regions. Thus, residual data in the coding unit may be split according to the transformation having the tree structure according to transformation depths.

A transformation depth indicating the number of splitting times to reach the transformation unit by splitting the height and width of the coding unit may also be set in the transformation unit. For example, in a current coding unit of 2N×2N, a transformation depth may be 0 when the size of a transformation unit is also 2N×2N, may be 1 when the size of the transformation unit is thus N×N, and may be 2 when the size of the transformation unit is thus N/2×N/2. That is, the transformation unit may be set according to a hierarchical tree structure according to the hierarchical characteristics of transformation depths.

Encoding information according to coding units corresponding to a coded depth uses not only information about the coded depth, but also about information related to prediction encoding and transformation. Accordingly, the coding unit determiner 120 not only determines a coded depth having a least encoding error, but also determines a partition type in a prediction unit, a prediction mode according to prediction units, and a size of a transformation unit for transformation.

Coding units according to a tree structure in a maximum coding unit and a method of determining a partition, according to exemplary embodiments, will be described in detail below with reference to FIGS. 3 through 13.

The coding unit determiner 120 may measure an encoding error of deeper coding units according to depths by using Rate-Distortion Optimization based on Lagrangian multipliers.

The output unit 130 outputs the image data of the maximum coding unit, which is encoded based on the at least one coded depth determined by the coding unit determiner 120, and information about the encoding mode according to the coded depth, in bitstreams.

The encoded image data may be obtained by encoding residual data of an image.

The information about the encoding mode according to coded depth may include information about the coded depth, about the partition type in the prediction unit, the prediction mode, and the size of the transformation unit.

The information about the coded depth may be defined by using split information according to depths, which indicates whether encoding is performed on coding units of a lower depth instead of a current depth. If the current depth of the current coding unit is the coded depth, image data in the current coding unit is encoded and output, and thus the split information may be defined not to split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one maximum coding unit, and information about at least one encoding mode is determined for a coding unit of a coded depth, information about at least one encoding mode may be determined for one maximum coding unit. Also, a coded depth of the image data of the maximum coding unit may be different according to locations since the image data is hierarchically split according to depths, and thus information about the coded depth and the encoding mode may be set for the image data.

Accordingly, the output unit 130 may assign encoding information about a corresponding coded depth and an encoding mode to at least one of the coding unit, the prediction unit, and a minimum unit included in the maximum coding unit. The output unit 130 may insert information about a corresponding coded depth and a corresponding coding mode into a header of a bitstream to transmit encoded video data, a Sequence Parameter Set (SPS) or a Picture Parameter Set (PPS), and may output them.

The minimum unit according to an exemplary embodiment is a rectangular data unit obtained by splitting the minimum coding unit constituting the lowermost depth by 4. The minimum unit according to an exemplary embodiment may be a maximum rectangular data unit that may be included in all of the coding units, prediction units, partition units, and transformation units included in the maximum coding unit.

For example, the encoding information output through the output unit 130 may be classified into encoding information according to coding units, and encoding information according to prediction units. The encoding information according to the coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode.

Also, coding unit structure information about a size and a variable depth of the coding unit defined according to sequences, pictures, slices, or GOPs may be inserted into a SPS, a PPS, or a header of a bitstream.

The variable depth may indicate not only an allowed maximum depth of current coding units having a tree structure but also may indicate a lowest depth of a coding unit having a minimum size, the number of depth levels, or depth variation.

The number of depth levels may indicate the number of the depth levels of deeper coding units according to depths that may exist in the current coding units having the tree structure. The depth variation may indicate the number of variation of the deeper coding units according to depths that may exist in the current coding units having the tree structure.

Information about the variable depth may be set according to sequences, pictures, slices, or GOPs. That is, the information about the variable depth and information about the maximum size or information about the minimum size of the coding unit from among the current coding units having the tree structure may be set for each of data units of the sequences, the pictures, the slices, or the GOPs.

Thus, the output unit 130 may include coding information including, as coding unit structure information, at least two of the information about the variable depth, the information about the maximum size of the coding unit, and the information about the minimum size of the coding unit, may insert the coding information into a header of a bitstream, i.e., a SPS or a PPS, and then may output the bitstream. The variable depth, the maximum size, and the minimum size of the coding unit are determined according to sequences, pictures, slices, or GOPs, respectively. In addition, the coding information output from the output unit 130 may include transformation indexes. Transformation index information may indicate information about a structure of a transformation unit that is used to transform the current coding unit. The transformation index information may indicate whether a current transformation unit is split into lower-level transformation units.

In the video encoding apparatus 100, the deeper coding unit may be a coding unit obtained by dividing a height or width of a coding unit of an upper depth, which is one level above, by two. In other words, when the size of the coding unit of the current depth is 2N×2N, the size of the coding unit of the lower depth is N×N. Also, the coding unit of the current depth having the size of 2N×2N may include maximum 4 of the coding unit of the lower depth.

Accordingly, the video encoding apparatus 100 may form the coding units having the tree structure by determining coding units having an optimum shape and an optimum size for each maximum coding unit, based on the size of the maximum coding unit and the maximum depth determined considering characteristics of the current picture. Also, since encoding may be performed on each maximum coding unit by using any one of various prediction modes and transformations, an optimum encoding mode may be determined considering characteristics of the coding unit of various image sizes.

Thus, if an image having high resolution or large data amount is encoded in a related art macroblock, a number of macroblocks per picture excessively increases. Accordingly, a number of pieces of compressed information generated for each macroblock increases, and thus it is difficult to transmit the compressed information and data compression efficiency decreases. However, by using the video encoding apparatus 100, image compression efficiency may be increased since a coding unit is adjusted while considering characteristics of an image while increasing a maximum size of a coding unit while considering a size of the image.

Figure 2:
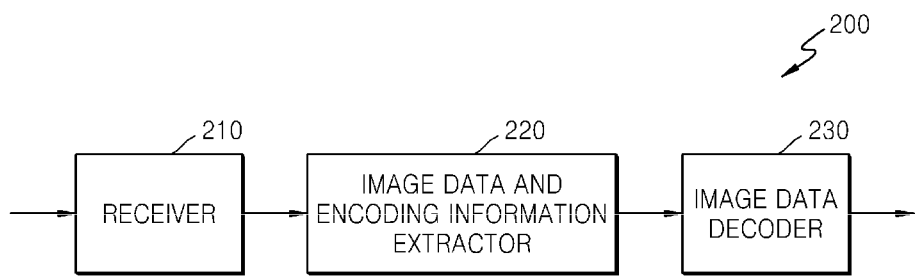
FIG. 2 is a block diagram of an apparatus for decoding a video by using a prediction unit based on coding units having a tree structure, according to an exemplary embodiment.

FIG. 2 is a block diagram of an apparatus for decoding a video by using a prediction unit based on coding units according to a tree structure 200, according to an exemplary embodiment.

The apparatus for decoding a video by using a prediction unit based on coding units according to a tree structure 200 includes a receiver 210, an image data and encoding information extractor 220, and an image data decoder 230. Hereinafter, for convenience of description, the apparatus for decoding a video by using a prediction unit based on coding units according to a tree structure 200 is referred to as 'video decoding apparatus 200'.

Definitions of various terms, such as a coding unit, a depth, a prediction unit, a transformation unit, and information about various encoding modes, for various operations of the video decoding apparatus 200 are identical to those described with reference to FIG. 1 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each maximum coding unit, and outputs the extracted image data to the image data decoder 230. The image data and encoding information extractor 220 may extract coding unit structure information about a size and a variable depth of a coding unit of a current picture, and information about a coded depth and an encoding mode from at least one of a header, an SPS, and a PPS with respect to the current picture from the received bitstream.

The image data and encoding information extractor 220 may extract the information about the variable depth and one of information about an allowable maximum size and information about an allowable minimum size of a coding unit from among coding units having a tree structure for each of data units of sequences, pictures, slices, or GOPs, from coding information. The image data decoder 230 may determine the allowable maximum size and the allowable minimum size of the coding unit from among the coding units having the tree structure for each of data units of sequences, pictures, slices, or GOPs, by using at least two pieces of the information about the variable depth, the information about the maximum size of the coding unit, and the information about the minimum size of the coding unit.

At least two pieces of the information about the variable depth, the information about the maximum size of the coding unit, and the information about the minimum size of the coding unit, which are determined for each of pictures, slices, or GOPs, may be extracted from the coding information, and an allowable maximum size and an allowable minimum size of a current data unit may be determined based on the read information. Also, the image data and encoding information extractor 220 extracts information about a coded depth and an encoding mode for the coding units having a tree structure according to each maximum coding unit, from the parsed bitstream. The extracted information about the coded depth and the encoding mode is output to the image data decoder 230. In other words, the image data in a bit stream is split into the maximum coding unit so that the image data decoder 230 decodes the image data for each maximum coding unit.

The information about the coded depth and the encoding mode according to the maximum coding unit may be set for information about at least one coding unit corresponding to the coded depth, and information about an encoding mode may include information about a partition type of a corresponding coding unit corresponding to the coded depth, about a prediction mode, and a size of a transformation unit. Also, splitting information according to depths may be extracted as the information about the coded depth.

Also, the image data decoder 230 may read information about transformation indexes from the coding information that is extracted from the parsed bitstream. The image data decoder 230 may configure a transformation unit of the current coding unit based on image data and transformation index information extracted by the image data and encoding information extractor 220, may perform inverse transformation of the current coding unit based on the transformation unit, and thus may decode encoded data. As a result of decoding the coding units, the current picture may be restored.

The information about the coded depth and the encoding mode according to each maximum coding unit extracted by the image data and encoding information extractor 220 is information about a coded depth and an encoding mode determined to generate a minimum encoding error when an encoder, such as the video encoding apparatus 100, repeatedly performs encoding for each deeper coding unit according to depths according to each maximum coding unit. Accordingly, the video decoding apparatus 200 may restore an image by decoding the image data according to a coded depth and an encoding mode that generates the minimum encoding error.

Since encoding information about the coded depth and the encoding mode may be assigned to a predetermined data unit from among a corresponding coding unit, a prediction unit, and a minimum unit, the image data and encoding information extractor 220 may extract the information about the coded depth and encoding mode according to the predetermined data units. The predetermined data units to which the same information about the coded depth and the encoding mode is assigned may be inferred to be the data units included in the same maximum coding unit.

The image data decoder 230 restores the current picture by decoding the image data in each maximum coding unit based on the information about the coded depth and the encoding mode according to the maximum coding units. In other words, the image data decoder 230 may decode the encoded image data based on the extracted information about the partition type, the prediction mode, and the transformation unit for each coding unit from among the coding units having the tree structure included in each maximum coding unit. A decoding process may include a prediction including intra prediction and motion compensation, and an inverse transformation. Inverse transformation may be performed according to method of inverse orthogonal transformation or inverse integer transformation.

The image data decoder 230 may perform intra prediction or motion compensation according to a partition and a prediction mode of each coding unit, based on the information about the partition type and the prediction mode of the prediction unit of the coding unit according to coded depths.

Also, the image data decoder 230 may perform inverse transformation according to each transformation unit in the coding unit, by reading the transformation unit according to a tree structure, and the information about the size of the transformation unit of the coding unit according to coded depths, so as to perform the inverse transformation according to maximum coding units.

The image data decoder 230 may determine at least one coded depth of a current maximum coding unit by using split information according to depths. If the split information indicates that image data is no longer split in the current depth, the current depth is a coded depth. Accordingly, the image data decoder 230 may decode encoded data of at least one coding unit corresponding to the each coded depth in the current maximum coding unit by using the information about the partition type of the prediction unit, the prediction mode, and the size of the transformation unit for each coding unit corresponding to the coded depth, and output the image data of the current maximum coding unit.

In other words, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode.

The video decoding apparatus 200 may obtain information about at least one coding unit that generates the minimum encoding error when encoding is recursively performed for each maximum coding unit, and may use the information to decode the current picture. In other words, the coding units having the tree structure determined to be the optimum coding units in each maximum coding unit may be decoded. Also, the maximum size of coding unit is determined considering resolution and an amount of image data.

Accordingly, even if image data has high resolution and a large amount of data, the image data may be efficiently decoded and restored by using a size of a coding unit and an encoding mode, which are adaptively determined according to characteristics of the image data, by using information about an optimum encoding mode received from an encoder.

A method of determining coding units having a tree structure, a prediction unit, and a transformation unit, according to an exemplary embodiment, will now be described with reference to FIGS. 3 through 13.

Figure 3:
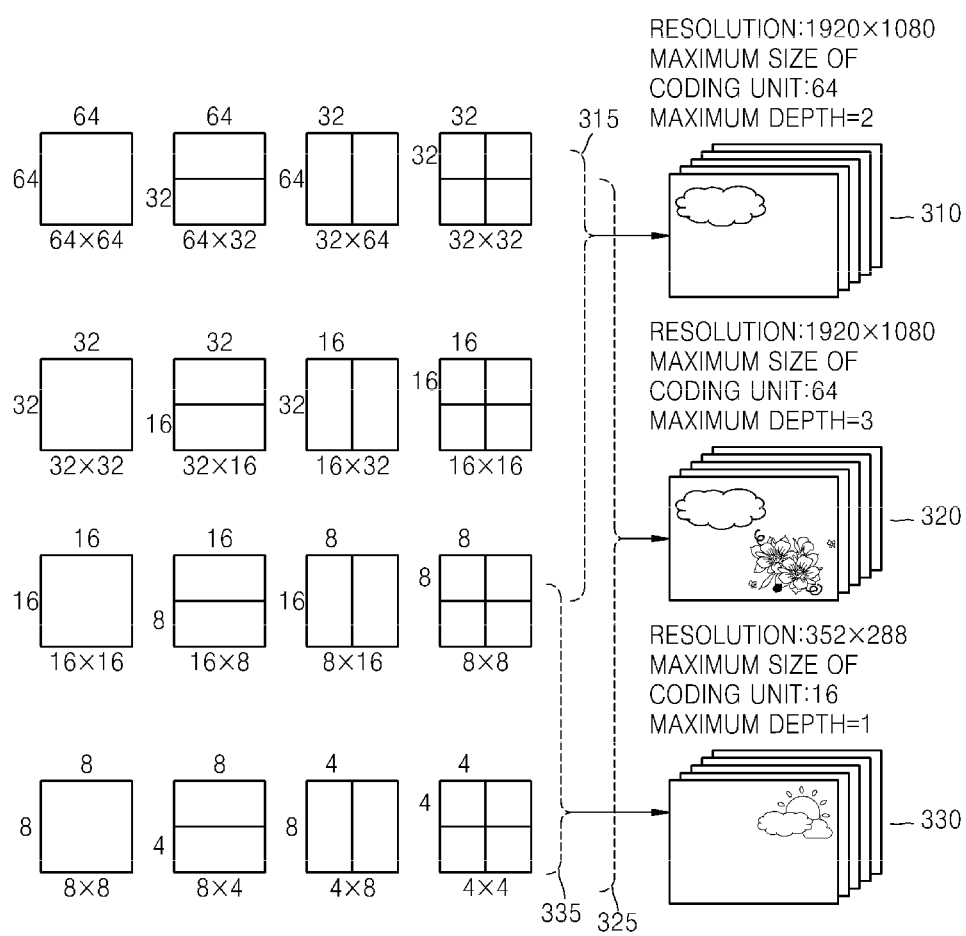
FIG. 3 is a diagram for describing a concept of coding units according to an exemplary embodiment.

FIG. 3 is a diagram for describing a concept of coding units according to an exemplary embodiment.

A size of a coding unit may be expressed in width×height, and may be 64×64, 32×32, 16×16, and 8×8.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 3 denotes a total number of splits from a maximum coding unit to a minimum decoding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having the higher resolution than the video data 330 may be 64.

Since the maximum depth of the video data 310 is 2, coding units 315 of the vide data 310 may include a maximum coding unit having a long axis size of 64, and coding units having long axis sizes of 32 and 16 since depths are deepened to two levels by splitting the maximum coding unit twice. Meanwhile, since the maximum depth of the video data 330 is 1, coding units 335 of the video data 330 may include a maximum coding unit having a long axis size of 16, and coding units having a long axis size of 8 since depths are deepened to one level by splitting the maximum coding unit once.

Since the maximum depth of the video data 320 is 3, coding units 325 of the video data 320 may include a maximum coding unit having a long axis size of 64, and coding units having long axis sizes of 32, 16, and 8 since the depths are deepened to 3 levels by splitting the maximum coding unit three times. As a depth deepens, detailed information may be precisely expressed.

Partition types of having sizes of 64×64, 64×32, and 32×64 may be set to a coding unit having a size of 64×64. Since the coding unit having the size of 64×64 is not a minimum decoding unit with respect to a plurality of pieces of the video data 310, 320, and 330, a partition type having a size of 32×32 may not be set.

Partition types of having sizes of 32×32, 32×16, and 16×32 may be set to a coding unit having a size of 32×32. Since the coding unit having the size of 32×32 is not a minimum decoding unit with respect to a plurality of pieces of the video data 310, 320, and 330, a partition type having a size of 16×16 may not be set.

Partition types of having sizes of 16×16, 16×8, and 8×16 may be set to a coding unit having a size of 16×16. Since the coding unit having the size of 16×16 is a minimum decoding unit with respect to the video data 310, a partition type having a size of 8×8 may be set. However, the coding unit having the size of 16×16 is not a minimum decoding unit with respect to a plurality of pieces of the video data 320 and 330, the partition type having the size of 8×8 may not be set.

In this regard, since the coding unit having the size of 8×8 is a minimum decoding unit with respect to a plurality of pieces of the video data 310, 320, and 330, not only the partitions types having the size of 8×8, 8×4, and 4×8 but also a partition type having a size of 4×4 may also be set.

Figure 4:
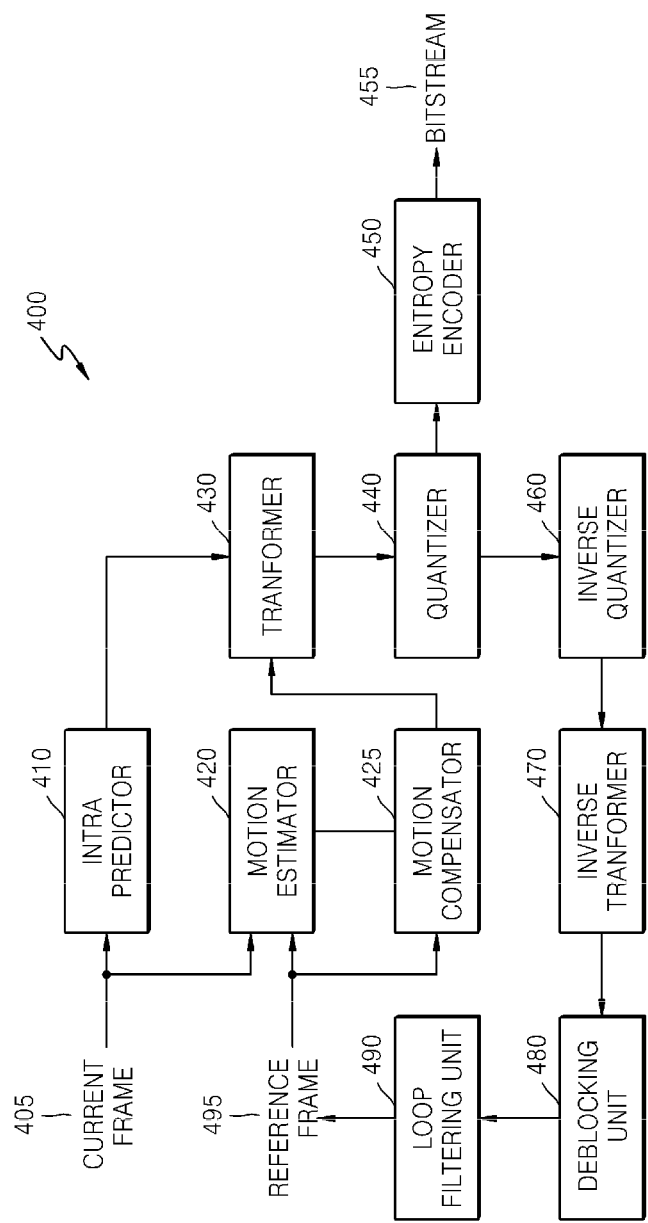
FIG. 4 is a block diagram of an image encoder based on coding units according to an exemplary embodiment.

FIG. 4 is a block diagram of an image encoder 400 based on coding units, according to an exemplary embodiment.

The image encoder 400 performs operations of the coding unit determiner 120 of the video encoding apparatus 100 to encode image data. In other words, an intra predictor 410 performs intra prediction on coding units in an intra mode, from among a current frame 405, and a motion estimator 420 and a motion compensator 425 performs inter estimation and motion compensation on coding units in an inter mode from among the current frame 405 by using the current frame 405, and a reference frame 495.

Data output from the intra predictor 410, the motion estimator 420, and the motion compensator 425 is output as a quantized transformation coefficient through a transformer 430 and a quantizer 440. The quantized transformation coefficient is restored as data in a spatial domain through an inverse quantizer 460 and an inverse transformer 470, and the restored data in the spatial domain is output as the reference frame 495 after being post-processed through a deblocking unit 480 and a loop filtering unit 490. The quantized transformation coefficient may be output as a bitstream 455 through an entropy encoder 450.

In order for the image encoder 400 to be applied in the video encoding apparatus 100, all elements of the image encoder 400, i.e., the intra predictor 410, the motion estimator 420, the motion compensator 425, the transformer 430, the quantizer 440, the entropy encoder 450, the inverse quantizer 460, the inverse transformer 470, the deblocking unit 480, and the loop filtering unit 490 perform operations based on each coding unit from among coding units having a tree structure while considering the maximum depth of each maximum coding unit.

Specifically, the intra predictor 410, the motion estimator 420, and the motion compensator 425 determines partitions and a prediction mode of each coding unit from among the coding units having a tree structure while considering the maximum size and the maximum depth of a current maximum coding unit, and the transformer 430 determines the size of the transformation unit in each coding unit from among the coding units having a tree structure.

Figure 5:
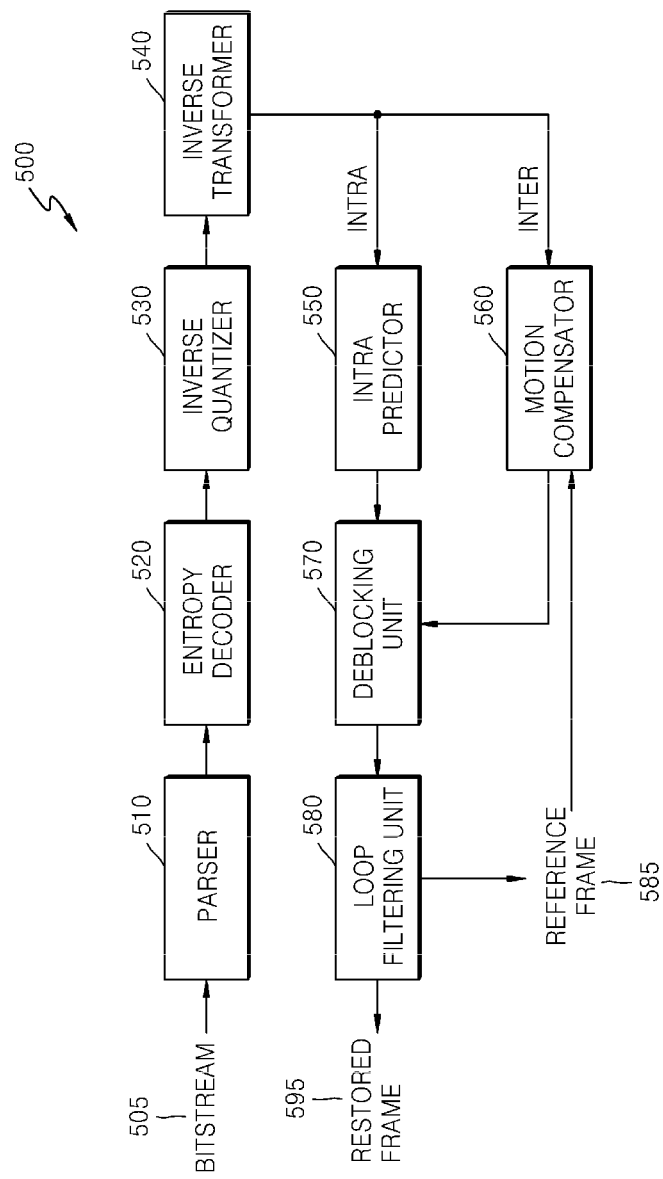
FIG. 5 is a block diagram of an image decoder based on coding units according to an exemplary embodiment.

FIG. 5 is a block diagram of an image decoder 500 based on coding units, according to an exemplary embodiment.

A parser 510 parses encoded image data to be decoded and information about encoding for decoding from a bitstream 505. The encoded image data is output as inverse quantized data through an entropy decoder 520 and an inverse quantizer 530, and the inverse quantized data is restored to image data in a spatial domain through an inverse transformer 540.

An intra predictor 550 performs intra prediction on coding units in an intra mode with respect to the image data in the spatial domain, and a motion compensator 560 performs motion compensation on coding units in an inter mode by using a reference frame 585.

The image data in the spatial domain, which passed through the intra predictor 550 and the motion compensator 560, may be output as a restored frame 595 after being post-processed through a deblocking unit 570 and a loop filtering unit 580. Also, the image data that is post-processed through the deblocking unit 570 and the loop filtering unit 580 may be output as the reference frame 585.

In order to decode the image data in the image data decoder 230 of the video decoding apparatus 200, the image decoder 500 may perform operations that are performed after the parser 510.

In order for the image decoder 500 to be applied in the video decoding apparatus 200, all elements of the image decoder 500, i.e., the parser 510, the entropy decoder 520, the inverse quantizer 530, the inverse transformer 540, the intra predictor 550, the motion compensator 560, the deblocking unit 570, and the loop filtering unit 580 perform operations based on coding units having a tree structure for each maximum coding unit.

Specifically, the intra prediction 550 and the motion compensator 560 perform operations based on partitions and a prediction mode for each of the coding units having a tree structure, and the inverse transformer 540 perform operations based on a size of a transformation unit for each coding unit.

Figure 6:
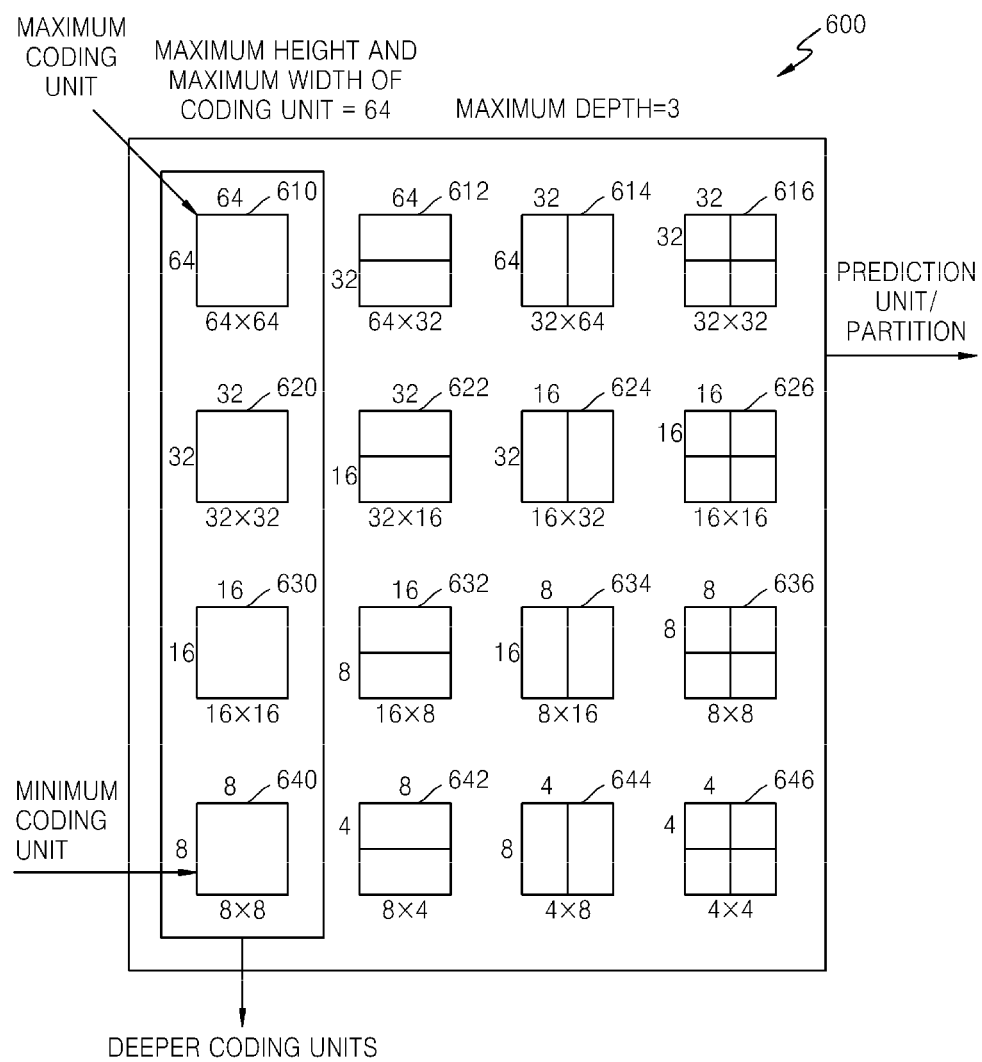
FIG. 6 is a diagram illustrating deeper coding units according to depths, and partitions according to an exemplary embodiment.

FIG. 6 is a diagram illustrating deeper coding units according to depths, and partitions, according to an exemplary embodiment.

The video encoding apparatus 100 and the video decoding apparatus 200 use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units, according to an exemplary embodiment, the maximum height and the maximum width of the coding units are each 64, and the maximum depth is 3. Here, the maximum depth indicates a total number of splits of the coding unit according to depths from a maximum coding unit to a minimum decoding unit. Since a depth deepens along a vertical axis of the hierarchical structure 600, a height and a width of the deeper coding unit are each split. Also, a prediction unit and partitions, which are bases for prediction encoding of each deeper coding unit, are shown along a horizontal axis of the hierarchical structure 600.

In other words, a coding unit 610 is a maximum coding unit in the hierarchical structure 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, and a coding unit 640 having a size of 8×8 and a depth of 3 exist. The coding unit 640 having a size of 8×8 and a depth of 3 is a minimum coding unit.

The prediction unit and the partitions of a coding unit are arranged along the horizontal axis according to each depth. In other words, if the coding unit 610 having the size of 64×64 and the depth of 0 is a prediction unit, the prediction unit may be split into partitions included in the coding unit 610, i.e., a partition 610 having a size of 64×64, partitions 612 having the size of 64×32, and partitions 614 having the size of 32×64. Since the coding unit 610 having the size of 64×64 is not a minimum coding unit, partitions having a size of 32×32 are not set.

Similarly, a prediction unit of the coding unit 620 having the size of 32×32 and the depth of 1 may be split into partitions included in the coding unit 620, i.e., a partition 620 having a size of 32×32, partitions 622 having a size of 32×16, and partitions 624 having a size of 16×32. Since the coding unit 620 having the size of 32×32 is not a minimum coding unit, partitions having a size of 16×16 are not set.

Similarly, a prediction unit of the coding unit 630 having the size of 16×16 and the depth of 2 may be split into partitions included in the coding unit 630, i.e., a partition having a size of 16×16 included in the coding unit 630, partitions 632 having a size of 16×8, and partitions 634 having a size of 8×16. Since the coding unit 630 having the size of 16×16 is not a minimum coding unit, partitions having a size of 8×8 are not set.

Finally, a prediction unit of the coding unit 640 having the size of 8×8 and the depth of 3 is a minimum coding unit and has a lowest depth and thus may be split into partitions included in the coding unit 640, i.e., a partition having a size of 8×8 included in the coding unit 640, partitions 642 having a size of 8×4, partitions 644 having a size of 4×8, and partitions 646 having a size of 4×4.

In order to determine the at least one coded depth of the coding units constituting the maximum coding unit 610, the coding unit determiner 120 of the video encoding apparatus 100 performs encoding for coding units corresponding to each depth included in the maximum coding unit 610.

A number of deeper coding units according to depths including data in the same range and the same size increases as the depth deepens. For example, four coding units corresponding to a depth of 2 are used to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths, by performing encoding for each depth as the depth deepens along the vertical axis of the hierarchical structure 600. A depth and a partition having the minimum encoding error in the coding unit 610 may be selected as the coded depth and a partition type of the coding unit 610.

FIG. 7 is a diagram for describing a relationship between a coding unit 710 and transformation units 720, according to an exemplary embodiment.

The video encoding apparatus 100 or 200 encodes or decodes an image according to coding units having sizes smaller than or equal to a maximum coding unit for each maximum coding unit. Sizes of transformation units for transformation during encoding may be selected based on data units that are not larger than a corresponding coding unit.

For example, in the video encoding apparatus 100 or 200, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error may be selected.

FIG. 8 is a diagram for describing encoding information of coding units corresponding to a coded depth, according to an exemplary embodiment.

The output unit 130 of the video encoding apparatus 100 may encode and transmit information 800 about a partition type, information 810 about a prediction mode, and information 820 about a size of a transformation unit for each coding unit corresponding to a coded depth, as information about an encoding mode.

The information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, and a partition 806 having a size of N×2N. Here, the information 800 about a partition type is set to indicate one of the partition 804 having a size of 2N×N and the partition 806 having a size of N×2N. However, when the current coding unit CU_0 having a size of 2N×2N is a minimum coding unit, the information 800 about a partition type may include a partition 808 having a size of N×N.

The information 810 indicates a prediction mode of each partition. For example, the information 810 may indicate a mode of prediction encoding performed on a partition indicated by the information 800, i.e., an intra mode 812, an inter mode 814, or a skip mode 816.

The information 820 indicates a transformation unit to be based on when transformation is performed on a current coding unit. For example, the transformation unit may be a first intra transformation unit 822, a second intra transformation unit 824, a first inter transformation unit 826, or a second intra transformation unit 828.

Figure 9:
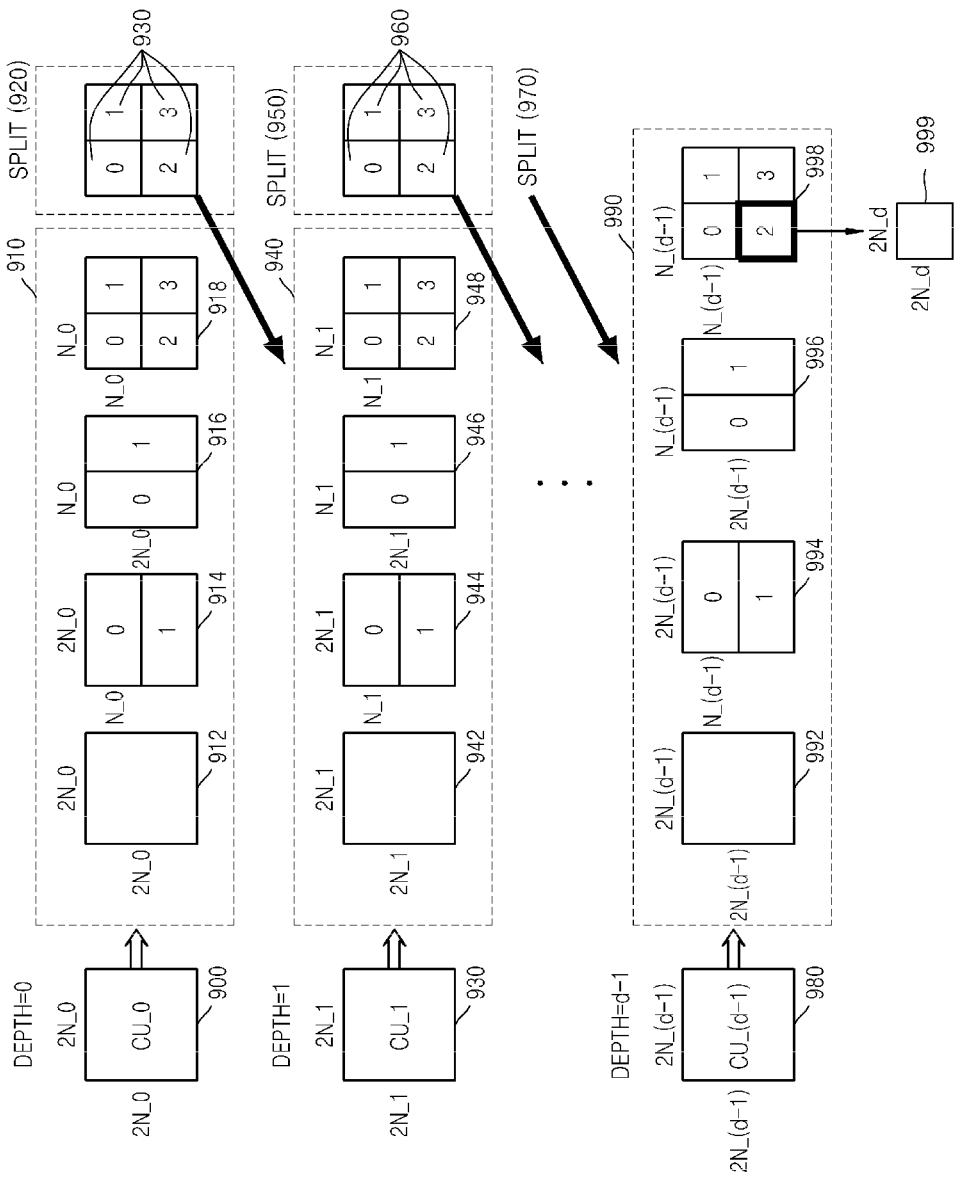
FIG. 9 is a diagram of deeper coding units according to depths, according to an exemplary embodiment.

The image data and encoding information extractor 220 of the video decoding apparatus 200 may extract and use the information 800, 810, and 820 for decoding, according to each deeper coding unit FIG. 9 is a diagram of deeper coding units according to depths, according to an exemplary embodiment.

Split information may be used to indicate a change of a depth. The spilt information indicates whether a coding unit of a current depth is split into coding units of a lower depth.

A prediction unit 910 for prediction-encoding a coding unit 900 having a depth of 0 and a size of 2N_0×2N_0 may include partitions of a partition type 912 having a size of 2N_0×2N_0, a partition type 914 having a size of 2N_0× N_0, and a partition type 916 having a size of N_0×2N_0. FIG. 9 only illustrates the partition types 912 through 916 which are obtained by symmetrically splitting the prediction unit 910, but a partition type is not limited thereto, and the partitions of the prediction unit 910 may include asymmetrical partitions, partitions having an arbitrary shape, and partitions having a geometrical shape.

Prediction encoding is repeatedly performed on one partition having a size of 2N_0×2N_0, two partitions having a size of 2N_0×N_0, and two partitions having a size of N_0×2N_0, according to each partition type. The prediction encoding in an intra mode and an inter mode may be performed on the partitions having the sizes of 2N_0×2N_0, N_0×2N_0, and 2N_0×N_0. The prediction encoding in a skip mode is performed only on the partition having the size of 2N_0×2N_0.

If an encoding error is smallest in one of the partition types 912 through 916 having the sizes of 2N_0×2N_0, N_0×2N_0, and 2N_0×N_0, the prediction unit 910 may not be split into a lower depth. However, if the encoding error is the smallest in coding units 930 having a size of N_0× N_0, a depth is changed from 0 to 1 to perform split (operation 920), and encoding is repeatedly performed on the coding units 930 having a depth of 1 and the size of N_0×N_0 to search for a minimum encoding error.

A prediction unit 940 for prediction-encoding the coding unit 930 having a depth of 1 and a size of 2N_1×2N_1 (=N_ 0×N_0) may include partitions of a partition type 942 having a size of 2N_1×2N_1, a partition type 944 having a size of 2N_1×N_1, and a partition type 946 having a size of N_1×2N_1.

If an encoding error is the smallest in coding units 960 having a size of N_2×N_2, compared to encoding errors in the partitions types 942 through 946 having the sizes of 2N_1×N_1, N_1×2N_1, and 2N_1×N_1, a depth is changed from 1 to 2 to perform split (operation 950), and encoding is repeatedly performed on the coding units 960, which have a depth of 2 and the size of N_2×N_2, to search for a minimum encoding error.

When a maximum depth is d−1, a coding unit according to each depth may be split up to when a depth becomes d−1, and split information may be encoded as up to when a depth is one of 0 to d−2. In other words, when encoding is performed up to when the depth is d−1 after a coding unit corresponding to a depth of d−2 is split in operation 970, a prediction unit 990 for prediction-encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1). Prediction encoding may be repeatedly performed on one partition having a size of 2N_(d−1)×2N_(d−1), two partitions having a size of 2N_(d−1)×N_ (d−1), two partitions having a size of N_(d−1)×2N_(d−1), four partitions having a size of N_(d−1)×N_(d−1) from among the partition types 992 through 998 to search for a partition type having a minimum encoding error.

Even when the partition type 998 has the minimum encoding error, since a maximum depth is d−1, a coding unit CU_(d−1) having a depth of d−1 is no longer split to a lower depth, and a coded depth for the coding units constituting a current maximum coding unit 900 is determined to be d−1 and a partition type of the current maximum coding unit 900 may be determined to be N_(d−1)×N_(d−1). Also, since the maximum depth is d−1 and a minimum coding unit 980 having a lowermost depth of d−1 is no longer split to a lower depth, split information for the minimum coding unit 980 is not set.

Since the coding unit 900 having the depth of 0 and the size of 2N_0×2N_0 and the coding unit 930 having the depth of 1 and the size of 2N_1×2N_1 are not minimum coding units, the prediction unit 910 for the coding unit 900 having the size of 2N_0×2N_0 may not include a partition type having a size of N_0×N_0, and the prediction unit 940 for the coding unit 930 having the size of 2N_1×2N_1 may not include a partition type having a size of N_1×N_1.

However, the prediction unit 990 for prediction encoding the coding unit 980 having the depth of d−1 which is a minimum coding unit may include the partition type 998 having a size of N_(d−1)×N_(d−1).

A data unit 999 may be a 'minimum unit' for the current maximum coding unit. A minimum unit according to an exemplary embodiment may be a rectangular data unit obtained by splitting a minimum coding unit 980 by 4. By performing the encoding repeatedly, the video encoding apparatus 100 may select a depth having the least encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 1 through d, and a depth having the least encoding error may be determined as a coded depth. The coded depth, the partition type of the prediction unit, and the prediction mode may be encoded and transmitted as information about an encoding mode. Also, since a coding unit is split from a depth of 0 to a coded depth, only split information of the coded depth is set to 0, and split information of depths excluding the coded depth is set to 1.

The image data and encoding information extractor 220 of the video decoding apparatus 200 may extract and use the information about the coded depth and the prediction unit of the coding unit 900 to decode the partition 912. The video decoding apparatus 200 may determine a depth, in which split information is 0, as a coded depth by using split information according to depths, and use information about an encoding mode of the coded depth for decoding coding unit corresponding to the coded depth.

Figure 10:
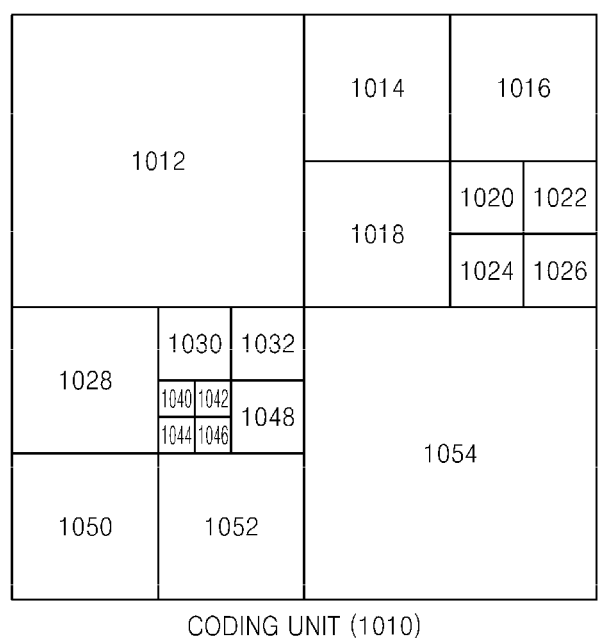
FIGS. 10 through 12 are diagrams for describing a relationship between coding units, prediction units, and transformation units, according to an exemplary embodiment.
Figure 11:
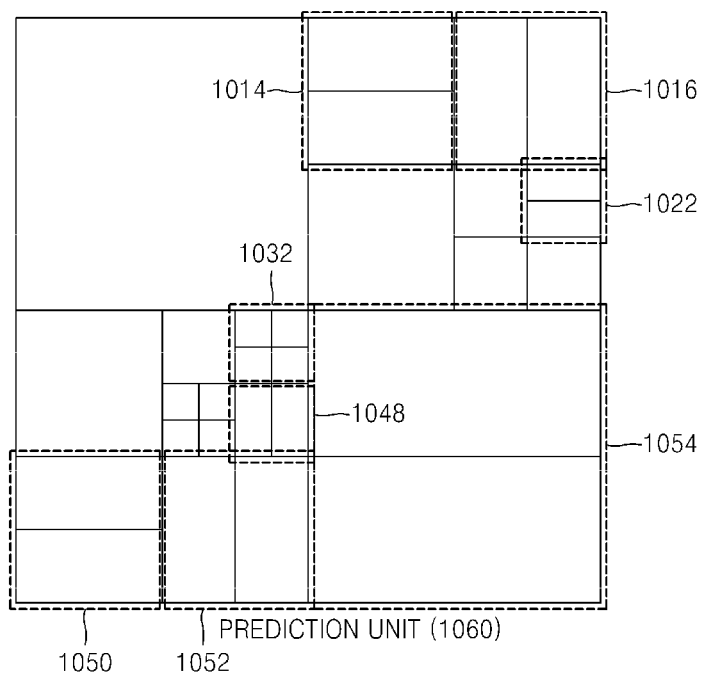
Figure 12:
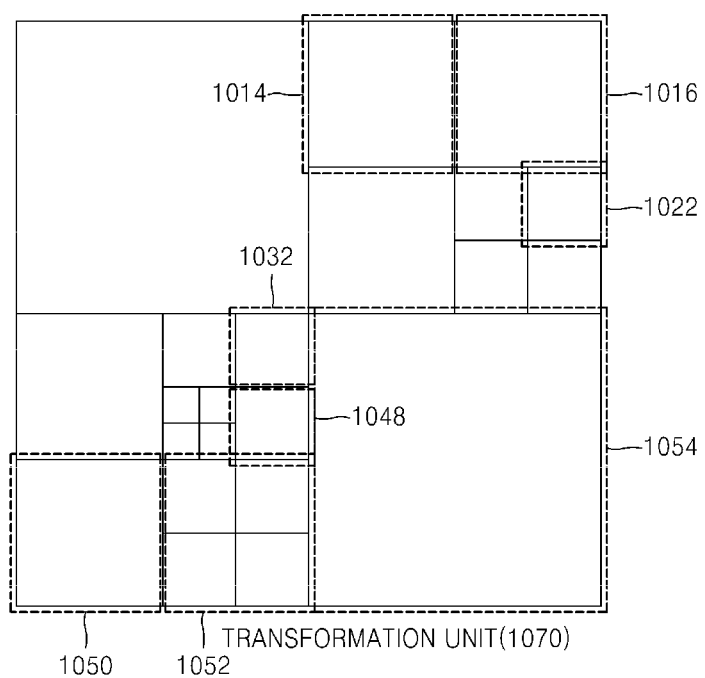

FIGS. 10 through 12 are diagrams for describing a relationship between coding units 1010, prediction units 1060, and transformation units 1070, according to an exemplary embodiment.

The coding units 1010 are coding units having a tree structure, corresponding to coded depths determined by the video encoding apparatus 100, in a maximum coding unit. The prediction units 1060 are partitions of prediction units of each of the coding units 1010, and the transformation units 1070 are transformation units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some coding units 1014, 1016, 1022, 1032, 1048, 1050, 1052, and 1054 are obtained by splitting the coding units in the coding units 1010. In other words, partition types in the coding units 1014, 1022, 1050, and 1054 have a size of 2N×N, partition types in the coding units 1016, 1048, and 1052 have a size of N×2N, and a partition type of the coding unit 1032 has a size of N×N. The partition type having the size of N×N may be set only when the coding unit 1032 is a minimum coding unit. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 in the transformation units 1070 are different from those in the prediction units 1060 in terms of sizes and shapes. In other words, the video encoding and decoding apparatuses 100 and 200 may perform intra prediction, motion estimation, motion compensation, transformation, and inverse transformation individually on a data unit in the same coding unit.

Accordingly, encoding is recursively performed on each of coding units having a hierarchical structure in each region of a maximum coding unit to determine an optimum coding unit, and thus coding units having a recursive tree structure may be obtained. Encoding information may include split information about a coding unit, information about a partition type, information about a prediction mode, and information about a size of a transformation unit. Table 1 shows the encoding information that may be set by the video encoding and decoding apparatuses 100 and 200.

TABLE 1

Split Information 0
(Encoding on Coding Unit having Size of
2N × 2N and Current Depth of d)

| Prediction Mode | Partition Type | | Size of Transformation Unit | | Split Information 1 |
|---|---|---|---|---|---|
| Intra Inter Skip (Only 2N × 2N) | Symmetrical Partition Type | Asymmetrical Partition Type | Split Information 0 of Transformation Unit | Split Information 1 of Transformation Unit | Repeatedly Encode Coding Units having Lower Depth of d + 1 |
| | 2N × 2N 2N × N N × 2N N × N | 2N × nU 2N × nD nL × 2N nR × 2N | 2N × 2N | N × N (Symmetrical Partition Type) N/2 × N/2 (Asymmetrical Partition Type) | |

The output unit 130 of the video encoding apparatus 100 may output the encoding information about the coding units having a tree structure, and the image data and encoding information extractor 220 of the video decoding apparatus 200 may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a coded depth, and thus information about a partition type, prediction mode, and a size of a transformation unit may be defined for the coded depth. If the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode is defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1. The symmetrical partition type of N×N may be set only when a current coding unit of 2N×2N is a minimum coding unit.

The size of the transformation unit may be set to be two types in the intra mode and two types in the inter mode. In other words, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

The encoding information about coding units having a tree structure may include at least one of a coding unit corresponding to a coded depth, a prediction unit, and a minimum unit. The coding unit corresponding to the coded depth may include at least one of a prediction unit and a minimum unit containing the same encoding information.

Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus a distribution of coded depths in a maximum coding unit may be determined.

Accordingly, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoded information of the data units, and the searched adjacent coding units may be referred for predicting the current coding unit.

Figure 13:
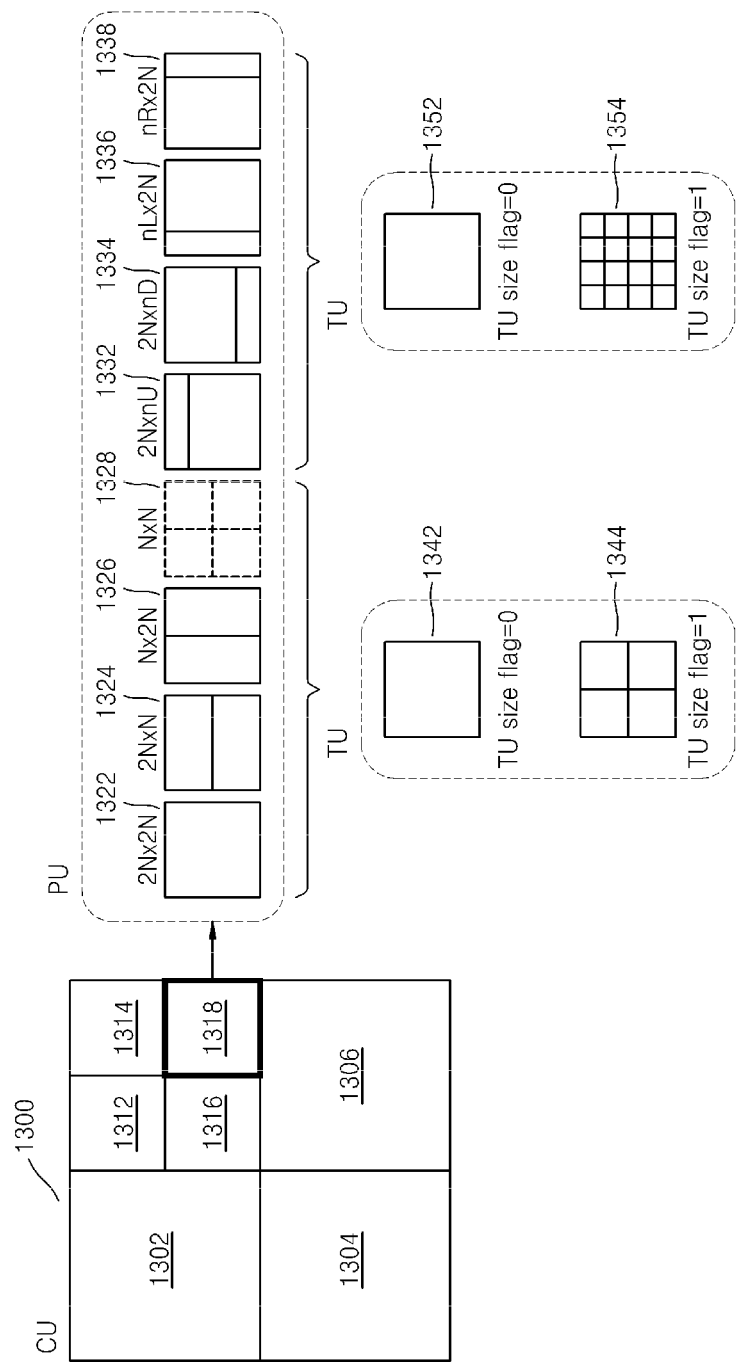
FIG. 13 is a diagram for describing a relationship between a coding unit, a prediction unit or a partition, and a transformation unit, according to encoding mode information of Table 1.

FIG. 13 is a diagram for describing a relationship between a coding unit, a prediction unit or a partition, and a transformation unit, according to encoding mode information of Table 1.

A maximum coding unit 1300 includes coding units 1302, 1304, 1306, 1312, 1314, 1316, and 1318 of coded depths. Here, since the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1332 having a size of 2N×nU, a partition type 1334 having a size of 2N×nD, a partition type 1336 having a size of nL×2N, and a partition type 1338 having a size of nR×2N. When the coding unit 1318 having the size of 2N×2N is a minimum coding unit, the information about a partition type may be set to a partition type 1328 having a size of N×N.

Split information (TU size flag) of transformation unit is a type of a transformation index, and a size of a transformation unit which corresponds to the transformation index may be changed according to a prediction unit type or a partition type of the coding unit.

For example, when the partition type is set to be symmetrical, i.e., the partition type 1322, 1324, 1326, or 1328, a transformation unit 1342 having a size of 2N×2N is set if the split information of transformation unit is 0, and a transformation unit 1344 having a size of N×N is set if a TU size flag is 1.

When the partition type is set to be asymmetrical, i.e., the partition type 1332, 1334, 1336, or 1338, a transformation unit 1352 having a size of 2N×2N is set if a TU size flag is 0, and a transformation unit 1354 having a size of N/2×N/2 is set if a TU size flag is 1.

Referring to FIG. 13, the TU size flag is a flag having a value or 0 or 1, but the TU size flag is not limited to 1 bit, and a transformation unit may be hierarchically split having a tree structure while the TU size flag increases from 0. The split information of transformation unit may be used as an example of the transformation index.

In this case, if the split information of transformation unit is used together with a maximum size of the transformation unit and a minimum size of the transformation unit, a size of the transformation unit which is actually used may be expressed. The video encoding apparatus 100 may encode maximum size information of transformation unit, minimum size information of transformation unit, and maximum split information of transformation unit. The encoded maximum size information of transformation unit, the encoded minimum size information of transformation unit, and the encoded maximum split information of transformation unit may be inserted into an SPS. The video decoding apparatus 200 may decode a video by using the maximum size information of transformation unit, the minimum size information of transformation unit, and the maximum split information of transformation unit.

In an example, (a) if a size of a current coding unit is 64×64, and the maximum size of the transformation unit is 32×32, (a-1) a size of the transformation unit may be set to 32×32 when the split information of transformation unit is 0, (a-2) the size of the transformation unit may be set to 16×16 when the split information of transformation unit is 1, and (a-3) the size of the transformation unit may be set to 8×8 when the split information of transformation unit is 2.

In another example, (b) if the size of the current coding unit is 32×32, and the minimum size of the transformation unit is 32×32, (b-1) the size of the transformation unit may be set to 32×32 when the split information of transformation unit is 0, and since the size of the transformation unit cannot be smaller than a size of 32×32, the split information of transformation unit cannot be further set.

In another example, (c) if the size of the current coding unit is 64×64, and the maximum split information of transformation unit is 1, the split information of transformation unit may be 0 or 1, and another split information of transformation unit cannot be set.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit, may be defined by Equation (1):

$$\text{CurrMinTuSize}=\max(\text{MinTransformSize},\text{RootTuSize}/(2^{\text{MaxTransformSizeIndex}})) \quad (1)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. In Equation (1), 'RootTuSize/(2^MaxTransformSizeIndex)' denotes a transformation unit size when the transformation unit size 'RootTuSize', when the TU size flag is 0, is split a number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to an exemplary embodiment, the maximum transformation unit size RootTuSize may vary according to the type of a prediction mode.

For example, if a current prediction mode is an inter mode, then RootTuSize' may be determined by using Equation (2) below. In Equation (2), 'MaxTransformSize' denotes a maximum transformation unit size, and 'PUSize' denotes a current prediction unit size.

$$RootTuSize=\min(MaxTransformSize, PUSize) \quad (2)$$

That is, if the current prediction mode is the inter mode, the transformation unit size 'RootTuSize' when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$RootTuSize=\min(MaxTransformSize, PartitionSize) \quad (3)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an example and the present invention is not limited thereto.

Figure 14:
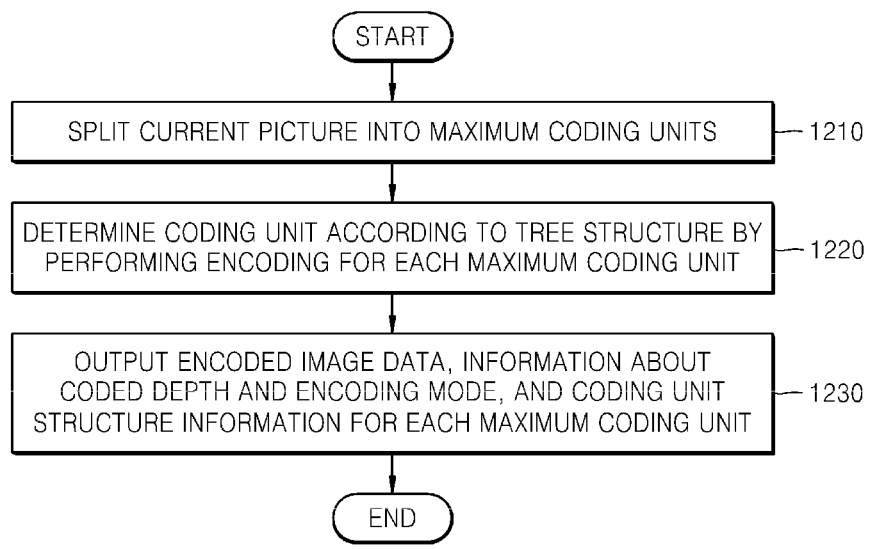
FIG. 14 is a flowchart illustrating a method of encoding a video by using a prediction unit based on coding units having a tree structure, according to an exemplary embodiment.

FIG. 14 is a flowchart illustrating a method of encoding a video by using a prediction unit based on coding units having a tree structure, according to an exemplary embodiment.

In operation 1210, a current picture is split into at least one maximum coding unit. A maximum depth indicating the total number of possible splitting times may be predetermined.

In operation 1220, a coded depth to output a final encoding result according to at least one split region, which is obtained by splitting a region of each maximum coding unit according to depths, is determined by encoding the at least one split region, and coding units according to a tree structure is determined.

The maximum coding unit is spatially split whenever the depth deepens, and thus is split into coding units of a lower depth. Each coding unit may be split into coding units of another lower depth by being spatially split independently from adjacent coding units. Encoding is repeatedly performed on each coding unit according to depths.

Also, a transformation unit according to partition types having the least encoding error is determined for each deeper coding unit. In order to determine a coded depth having a minimum encoding error in each maximum coding unit, encoding errors may be measured and compared in all deeper coding units according to depths.

When the transformation unit is determined, a transformation unit for transformation of the coding unit may be determined. The transformation unit according to the present exemplary embodiment may be determined as a data unit to minimize an error incurred by the transformation unit for transformation of the coding unit.

In each maximum coding unit, a picture is encoded based on a partition type that is determined based on coding units according to depths, and depths of the coding units according to depths, and coding units of a coded depth are independently determined for each of the coding units according to depths, so that the coding units having a tree structure may be determined.

In at least one of cases in which a current coding unit is no longer split into coding units of a lower depth, in which the current coding unit is a maximum coding unit from among current maximum coding units, and in which the current coding unit is a coding unit of a lowest depth from among the current maximum coding units, a partition type of the current coding unit may further include a partition having the same size as the coding unit of a lower depth. The partition type may include symmetrical partitions that are obtained by symmetrically splitting a height or width of the current coding unit, partitions obtained by asymmetrically splitting the height or width of the current coding unit, partitions that are obtained by geometrically splitting the current coding unit, or partitions having arbitrary shapes. The prediction encoding may be performed based on the partition type and the prediction mode of a prediction unit with respect to the current coding unit.

Accordingly, in at least one of cases in which the current coding unit is no longer split into the coding units of a lower depth, in which the current coding unit is the minimum coding unit from among the current maximum coding units, and in which the current coding unit is the coding unit of a lowest depth from among the current maximum coding units, prediction encoding may be performed by using not only the symmetrical partitions that are obtained by symmetrically splitting a height or width of the current coding unit, the partitions obtained by asymmetrically splitting the height or width of the current coding unit, the partitions that are obtained by geometrically splitting the current coding unit, and the partitions having arbitrary shapes but also by using the partition having the same size as the coding unit of a lower depth.

In addition, in at least one of cases in which the current coding unit may be split into the coding units of a lower depth, in which the current coding unit is not the coding unit of a lowest depth from among the current maximum coding units, and in which the current coding unit is the coding unit of a lowest depth from among the current maximum coding units, intra prediction and inter prediction which are performed by using the partition having the same size as the coding unit of a lower depth may be skipped.

In operation 1230, encoded image data constituting the final encoding result according to the coded depth is output for each maximum coding unit, with encoding information about the coded depth and an encoding mode. The information about the encoding mode may include information about a coded depth or split information, information about a partition type of a prediction unit, information about a prediction mode, information about a size of a transformation unit, transformation index information, and the like.

Coding unit structure information about a size and a variable depth of the coding unit defined according to a data unit such as sequences, pictures, slices, or GOPs may be inserted into a header of a bitstream, a SPS, or a PPS and then may be output. The encoded information about the encoding mode, and the coding unit structure information about the size and the variable depth of the coding unit may be inserted into the header of the bitstream, the SPS, or the PPS and then may be transmitted to a decoder with the encoded image data.

Figure 15:
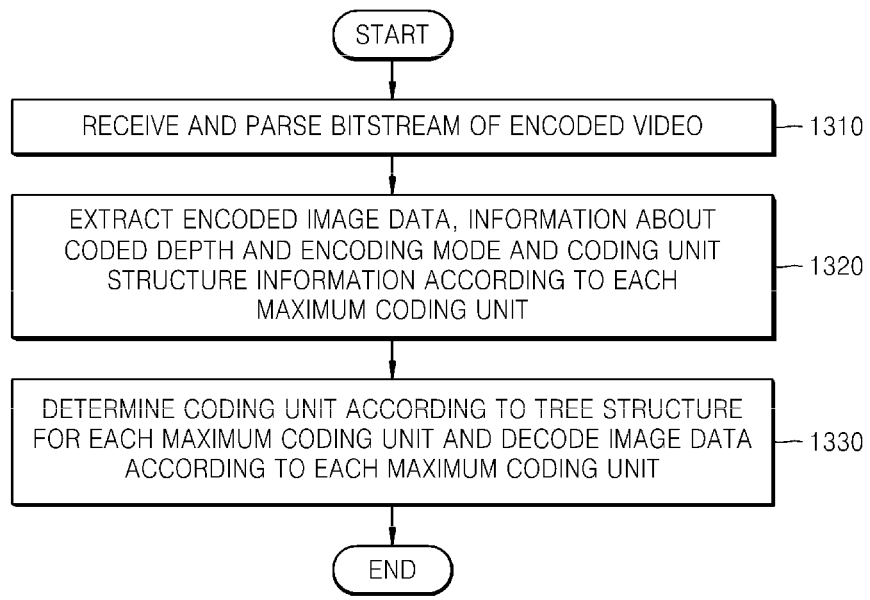
FIG. 15 is a flowchart illustrating a method of decoding a video by using a prediction unit based on coding units having a tree structure, according to an exemplary embodiment.

FIG. 15 is a flowchart illustrating a method of decoding a video by using a prediction unit based on coding units having a tree structure, according to an exemplary embodiment.

In operation 1310, a bitstream of an encoded video is received and parsed.

In operation 1320, encoded image data of a current picture assigned to a maximum coding unit, and information about a coded depth and an encoding mode according to maximum coding units, and the coding unit structure information about the size and the variable depth of the coding unit are extracted from the parsed bitstream. The information about the coded depth and the encoding mode, the coding unit structure information about the size and the variable depth of the coding unit, and the split information may be extracted from a header of a bitstream, a SPS, or a PPS.

The coded depth of each maximum coding unit is a depth having the least encoding error in each maximum coding unit. In encoding each maximum coding unit, the image data is encoded based on at least one data unit obtained by hierarchically splitting the each maximum coding unit according to depths.

According to the information about the coded depth and the encoding mode, the maximum coding unit may be split into coding units having a tree structure. Each of the coding units having the tree structure is determined as a coding unit corresponding a coded depth, and is optimally encoded as to output the least encoding error. Accordingly, encoding and decoding efficiency of an image may be improved by decoding each piece of encoded image data in the coding units after determining at least one coded depth according to coding units.

The maximum size and the minimum size of the coding unit from among the current coding units having the tree structure may be determined based on the coding information including at least two of the information about the variable depth of the current coding units having the tree structure, the information about the maximum size of the coding unit, and the information about the minimum size of the coding unit.

Also, the transformation units according to the tree structure in the coding units may be determined based on the transformation index of the coding information.

A partition type may be determined based on a depth of a current coding unit, and prediction decoding is performed based on the coding units and the partition type, so that the picture maybe decoded. The partition type according to the present exemplary embodiment may include at least one of partitions having the same size as the current coding unit, partitions that are obtained by dividing a height or width of the current coding unit by two, symmetrical partitions that are obtained by symmetrically splitting the height or width of the current coding unit, partitions obtained by asymmetrically splitting the height or width of the current coding unit, partitions that are obtained by geometrically splitting the current coding unit, and partitions having arbitrary shapes.

In at least one of cases in which the current coding unit is no longer split into the coding units of a lower depth, in which the current coding unit is a minimum coding unit from among current maximum coding units, and in which the current coding unit is a coding unit of a lowest depth from among the current maximum coding units, the partition type of the current coding unit may further include a partition having the same size as the coding unit of a lower depth.

In operation 1330, the image data of each maximum coding unit is decoded based on the information about the coded depth and the encoding mode according to the maximum coding units.

A maximum size and a minimum size of the coding units may be read based on coding unit structure information and split information, and thus the coding units having the tree structure may be determined. The information about the partition type and the prediction mode of the prediction unit of the coding unit may be read from the information about the encoding mode, and prediction decoding may be performed with respect to the coding units based on the information about the partition type and the prediction mode, so that the current coding unit may be decoded.

For example, in at least one of cases in which the current coding unit may be split into the coding units of a lower depth, in which the current coding unit is not the coding unit of a lowest depth from among the current maximum coding units, and in which the current coding unit is the coding unit of a lowest depth from among the current maximum coding units, intra prediction or inter prediction/compensation units, which are performed by using the partition having the same size as the coding unit of a lower depth may be skipped.

However, in at least one of cases in which the current coding unit is no longer split into the coding units of a lower depth, in which the current coding unit is the minimum coding unit from among the current maximum coding units, and in which the current coding unit is the coding unit of a lowest depth from among the current maximum coding units, the intra prediction or the inter prediction/compensation may be performed by using not only the partitions having the same size as the current coding unit, the partitions obtained by dividing a height or width of the current coding unit by two, and the partitions obtained by asymmetrically splitting the height or width of the current coding unit but also by using the partition having the same size as the coding unit having a depth lower than that of the current coding unit.

The decoded image data may be reproduced by a reproducing apparatus, stored in a storage medium, or transmitted through a network.

An exemplary embodiment can be written as computer programs and can be implemented in general-use digital computers that execute the programs using a computer readable recording medium. Examples of the computer readable recording medium include magnetic storage media (e.g., ROM, floppy disks, hard disks, etc.) and optical recording media (e.g., CD-ROMs, or DVDs). Moreover, it is understood that in exemplary embodiments, one or more units and elements of the above-described apparatuses can include circuitry, a processor, a microprocessor, etc., and may execute a computer program stored in a computer-readable medium.

While exemplary embodiments have been particularly shown and described above, it will be understood by those of ordinary skill in the art that various changes in form and details may be made therein without departing from the spirit and scope of the present inventive concept as defined by the appended claims. The above-described exemplary embodiments should be considered in descriptive sense only and not for purposes of limitation. Therefore, the scope of the inventive concept is defined not by the detailed description of exemplary embodiments but by the appended claims, and all differences within the scope will be construed as being included in the present inventive concept.

What is claimed is:

1. An apparatus for decoding a video, the apparatus comprising:
   a receiver configured to receive a bitstream with respect to an encoded video; and
   a decoder configured to extract, from the received bitstream, coding unit structure information indicating a size of a coding unit that is a data unit for decoding of a picture of the encoded video,
   a variable depth of the coding unit, information about a coded depth of the coding unit, and information about an encoding mode indicating one among prediction types including skip mode, inter mode and intra mode,
   determine a current coding unit based on the coding unit structure information, the variable depth of the coding unit and the information about the coded depth, determine a prediction type of the current coding unit based on the information about the encoding mode, and perform prediction cm at least one prediction unit of the current coding unit according to the prediction type, wherein, when the prediction type is the skip mode, the decoder is configured to determine a prediction unit having a same size as the current coding unit, when the prediction type is one of the intra mode and the inter mode, the decoder is configured to extract partition type information indicating a partition of a prediction unit, when the prediction type is the intra mode, the decoder is configured to determine a prediction unit including at least one square block, from the current coding unit, based on the partition type information, and, when the prediction type is the inter mode, the decoder is configured to determine a prediction unit including one of a partition, symmetric partitions and asymmetric partitions, from the current coding unit, based cm the partition type information, wherein the symmetric partitions are obtained by symmetrically splitting at least one of a height and a width of the current coding unit, and wherein the asymmetric partitions are obtained by asymmetrically splitting one of the height and the width of the current coding unit.

* * * * *

UNITED STATES PATENT AND TRADEMARK OFFICE
CERTIFICATE OF CORRECTION

PATENT NO. : 9,712,823 B2
APPLICATION NO. : 15/400424
DATED : July 18, 2017
INVENTOR(S) : Jung-hye Min, Woo-jin Han and Il-koo Kim Page 1 of 1

It is certified that error appears in the above-identified patent and that said Letters Patent is hereby corrected as shown below:

In the Claims

In Claim 1, Column 27, Line 3, delete "cm" and insert --on-- therefor;

In Claim 1, Column 27, Line 19, delete "cm" and insert --on-- therefor.

Signed and Sealed this
Eighteenth Day of August, 2020

Andrei Iancu
*Director of the United States Patent and Trademark Office*